US011803865B2

(12) United States Patent
Fang et al.

(10) Patent No.: US 11,803,865 B2
(45) Date of Patent: Oct. 31, 2023

(54) GRAPH BASED PROCESSING OF MULTIDIMENSIONAL HIERARCHICAL DATA

(71) Applicant: Capital One Services, LLC, McLean, VA (US)

(72) Inventors: Jiashen Fang, Princeton, NJ (US); Joakim Fagerstedt Cedin, Cambridge, MA (US); Kirk Brunson, Malden, MA (US); Ryan Griffin, Millbury, MA (US); Cavan Spillane Stone, Maynard, VA (US)

(73) Assignee: Capital One Services, LLC, McLean, VA (US)

( * ) Notice: Subject to any disclaimer, the term of this patent is extended or adjusted under 35 U.S.C. 154(b) by 246 days.

(21) Appl. No.: 17/096,661

(22) Filed: Nov. 12, 2020

(65) Prior Publication Data

US 2022/0148016 A1    May 12, 2022

(51) Int. Cl.
*G06Q 30/0201*    (2023.01)
*G06F 16/901*    (2019.01)
(Continued)

(52) U.S. Cl.
CPC ..... *G06Q 30/0201* (2013.01); *G06F 16/2264* (2019.01); *G06F 16/24566* (2019.01);
(Continued)

(58) Field of Classification Search
CPC ................................................ G06Q 30/0201
See application file for complete search history.

(56) References Cited

U.S. PATENT DOCUMENTS

| 6,556,983 B1 * | 4/2003 | Altschuler ........... G06K 9/6296 707/E17.011 |
| 7,203,701 B1 * | 4/2007 | Packebush ............ G06F 16/904 715/713 |

(Continued)

OTHER PUBLICATIONS

Martin Wattenberg, Visual Exploration of Multivariate Graphs, CHI 2006 Proceedings • Visualization 1 Apr. 22-27, 2006, pp. 811-819 (Year: 2006).*

(Continued)

*Primary Examiner* — Andre D Boyce
(74) *Attorney, Agent, or Firm* — Banner & Witcoff, Ltd.

(57) ABSTRACT

Multidimensional data analysis applications, including OLAP applications, simultaneously aggregate across many sets of dimensions. However, computing multidimensional aggregates is a performance bottleneck for OLAP data analysis applications. In order to improve the speed of interactive analysis, OLAP databases often precompute aggregates at various levels of detail and on various combinations of data attributes. However, the cost and speed of precomputation influences how frequently the aggregates can be brought up-to-date. Systems and methods disclosed herein provide graph based multidimensional analysis processing without pre-aggregating or precomputing the data along dimensional hierarchies, and by providing the results to the end user on-demand. Since preaggregation or precomputation of data along dimensional hierarchies is not necessary, implementations allow the end user to perform data analysis as soon as the data is available.

20 Claims, 17 Drawing Sheets

(51) Int. Cl.
*G06Q 10/10* (2023.01)
*G06F 16/28* (2019.01)
*G06F 16/2455* (2019.01)
*G06F 16/22* (2019.01)

(52) U.S. Cl.
CPC ........ *G06F 16/283* (2019.01); *G06F 16/9024* (2019.01); *G06Q 10/10* (2013.01)

(56) References Cited

U.S. PATENT DOCUMENTS

| | | | |
|---|---|---|---|
| 8,065,262 | B2 | 11/2011 | Bailey |
| 2006/0053136 | A1 | 3/2006 | Ashiri |
| 2012/0131139 | A1* | 5/2012 | Siripurapu ............ G06F 16/951 709/217 |
| 2013/0019008 | A1* | 1/2013 | Jorgenson ............... H04L 41/12 709/224 |
| 2013/0051248 | A1* | 2/2013 | Pei ..................... H04L 41/0618 370/245 |
| 2014/0032617 | A1* | 1/2014 | Stanfill .................. G06F 16/25 707/809 |
| 2015/0186825 | A1* | 7/2015 | Balasubramhanya ....................... G06Q 10/067 705/7.25 |
| 2015/0261881 | A1* | 9/2015 | Wensel .................. G06F 9/4494 707/798 |
| 2015/0339415 | A1* | 11/2015 | Klein ...................... G06F 30/20 703/6 |
| 2016/0259832 | A1* | 9/2016 | Shore ................... G06F 16/9024 |
| 2017/0075973 | A1 | 3/2017 | Miranker |
| 2017/0221240 | A1* | 8/2017 | Stetson ................. G06T 11/206 |
| 2020/0081445 | A1* | 3/2020 | Stetson .................... G06N 5/02 |
| 2021/0182273 | A1* | 6/2021 | Zdornov .................. G06F 16/13 |
| 2021/0279280 | A1* | 9/2021 | M G .................. G06F 16/2246 |

OTHER PUBLICATIONS

Chen et al, Graph OLAP: a multi-dimensional framework for graph data analysis, Knowl Inf Syst (2009) 21:41-63 (Year: 2009).*
K. Xirogiannopoulos et al, Memory-Efficient Group-by Aggregates over Multi-Way Joins, arXiv:1906.05745v2 [cs.DB] Jun. 17, 2019.
A. Ghrab et al, A Framework for building OLAP Cubes on Graphs, Conference Paper, Sep. 2015.

* cited by examiner

Account 1505

Department 1510

GRAPH BASED PROCESSING OF MULTIDIMENSIONAL HIERARCHICAL DATA

FIELD OF USE

Aspects described herein generally relate to data processing of data, and hardware and software related thereto and more specifically to graph-based processing of multidimensional data.

BACKGROUND

Large organizations typically generate vast amounts of data as part of running their business processes. Examples of generated data can include sales data of a large multinational organization, loan and deposits data for a commercial bank, customer spend data for a credit card firm, patient response data during a drug trial, etc. As an example, a sale transaction can include a large number of dimensions including, but not limited to, product, sales person, location, time of sale, customer, etc.

The data can change over time, adapting to business changes. Data analytic activities include understanding the evolution of this data over time and "drilling down" or "rolling up" the data. For example, the data can be queried to determine how a sales organization performed in selling a product category in a specific region for a specific customer group. As another example, the data can be queried to determine which teams within the sales organization were leading or lagging and on which specific products.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

Large organizations typically generate vast amounts of data as part of running their business processes. The generated data can include a time component. The generated data can also include a multitude of observations or transactions. The transactions in turn can have tags, identities, and/or attributes that are referred to as dimensions. As an example, data related to a location dimension can be captured as a zip or postal code, which can successively roll into data related to a county, state, nation, and continent. Similarly, other dimensions can have other hierarchies associated with them. A dimension can have multiple nested hierarchies within the dimension. As an example, data related to a zip or postal code can be rolled into data related to a sales territory, a sales region, and a market. In some instances, dimensions can have tens of thousands of discrete values. with hierarchies that can be several dozen levels deep. Querying multidimensional data involves aggregation or consolidation across multidimensional hierarchies to determine the data relationships for one or more dimensions. However, with dozens of dimensions, tens of levels within each dimensional hierarchy, and thousands of discrete dimensions, the possible query space can easily far exceed the computation capabilities of most computers.

OLAP (On-Line Analytical Processing) applications allow end-clients to perform ad hoc analysis of multidimensional data, providing insight and understanding for better decision making. In an OLAP modeling of the data, records are organized into various dimensions, and each dimension includes multiple levels of abstraction described by hierarchies. This organization allows users to view the data from various perspectives. A number of OLAP data cube operations exist to obtain these different views, allowing interactive user queries of the records. At the heart of all multidimensional data analysis applications is the ability to simultaneously aggregate across many sets of dimensions. However, computing multidimensional aggregates is a performance bottleneck for OLAP data analysis applications. In order to improve the speed of interactive analysis, OLAP databases often include aggregated data at various levels of detail and on various combinations of data attributes. However, the cost and speed of precomputation influences how frequently the aggregates can be brought up-to-date.

Systems and methods disclosed herein generate hypergraph representations of data stores. The hypergraph representations can be queried in parallel to quickly identify data satisfying queries that would be computationally infeasible to execute on the data stores. Implementations achieve tradeoffs between compute power, time to pre-aggregate, user experience when drilling down or rolling up, and the number of elements and levels allowed in the dimensions and hierarchies respectively. The hypergraph representations can be used to provide results on demand without pre-aggregating or pre-computing the data along dimensional hierarchies. Since pre-aggregation or pre-computation of data along dimensional hierarchies is not necessary, implementations allow the end user to perform data analysis as soon as the data is available. This approach also allows the end user to work with streaming data because the end user view can be updated in real time as the streaming data is processed. The end user can dynamically change the dimension structure and see the impact in real time resulting in significant compute cost savings since only the necessary views are calculated. The end user can also modify aggregation functions and view the output interactively. Implementations disclosed herein provide several functionalities for dynamic multidimensional analysis of consolidated data supporting analytical activities. These include calculations and modeling applied across dimensions, through hierarchies and/or across members, trend analysis over sequential time periods, slicing and dicing of subsets for analysis, drill-down to deeper levels of consolidation, reach-through to underlying details of data, rotation to new dimensional comparisons in the viewing area, calculated values, or members with derived formulas. Implementations also allow analysts to quickly and dynamically develop deep insight into the data as viewed through an arbitrary combination of dimensional hierarchies that can be updated in real time, thereby, saving time and compute costs, and allow analysts to gain insights that can otherwise he missed.

In an embodiment of the invention, a computer-implemented method includes receiving a query indicating one or more dimensions of a data store, identifying, based on the one or more dimensions, a plurality of directed acyclic graphs (DAGs) corresponding to the one or more dimensions, wherein each DAG includes a representation of a hierarchical structure within the dimensions, each DAG includes a plurality of nodes corresponding to a plurality of members of the corresponding dimension, and the plurality of DAGs include a plurality of hyperedges, each hyperedge corresponding to a unique combination including at least one node from each of the DAGs, generating a result by aggregating one or more nodes of the plurality of DAGs, and sending, to a computing device, the generated result.

In yet another embodiment of the invention, the aggregating includes selecting one or more hyperedges based on performing a plurality of graph traversals of the plurality of DAGs and determining the result based on numerical values associated with the selected one or more hyperedges.

In still another embodiment of the invention, the computer-implemented method further includes retrieving, based on the selected one or more hyperedges, data including the numerical values of the selected one or more hyperedges.

In yet still another embodiment of the invention, generating the result by aggregating the one or more nodes of the plurality of DAGs includes recursively decomposing the query to generate at least one sub-query and a set of operations, executing each of the at least one sub-query to generate a set of intermediate results, and aggregating each of the intermediate results based on the set of operations.

In yet another additional embodiment of the invention, the aggregating includes identifying at least one hyperedge that is not indicated in the data store and generating the result includes calculating a Cartesian product of all contributing sink nodes to at least one hyperedge that is not indicated in the data store.

In still another additional embodiment of the invention, the query further indicates an aggregation of product sales data over a predetermined time period and the computer-implemented method further includes determining, based on the generated result, current sales data and historical sales data and determining, based on comparing the current sales data and the historical sales data, a change in the product sales data over the predetermined time period.

In yet still another additional embodiment of the invention, the number of nodes identified in each of the hyperedges is the same.

In yet another embodiment of the invention, the computer-implemented method further includes determining at least one additional dimension related to the generated result that is not identified in the query and generating a second result by aggregating one or more nodes of the plurality of DAGs including the DAG corresponding to the at least one additional dimension.

Still another embodiment of the invention includes an apparatus including one or more processors and memory storing instructions that, when executed by the one or more processors, cause the apparatus to receive a query indicating one or more dimensions of a data store, identify, based on the one or more dimensions, a plurality of directed acyclic graphs (DAGs) corresponding to the one or more dimensions, wherein each DAG includes a representation of a hierarchical structure within the one or more dimensions each DAG includes a plurality of nodes corresponding to a plurality of members of the corresponding dimension, and the plurality of DAGs include a plurality of hyperedges, and wherein each hyperedge corresponds to a unique combination including at least one node from each of the plurality of DAGs, generate a result by selecting one or more hyperedges based on performing a plurality of graph traversals of the plurality of DAGs and determining the result based on numerical values associated with the selected one or more hyperedges, and send, to a computing device, the generated result.

In yet another embodiment of the invention, the instructions, when executed by the one or more processors, cause the apparatus to retrieve, based on the selected one or more hyperedges, data including the numerical values of the selected one or more hyperedges.

In still another embodiment of the invention, the instructions, when executed by the one or more processors, cause the apparatus to aggregate by identifying at least one hyperedge that is not indicated in the data store and generate the result by calculating a Cartesian product of all contributing sink nodes to at least one hyperedge that is not indicated in the data store.

In yet still another embodiment of the invention, the query is directed towards obtaining product sales data over a predetermined time period and the instructions, when executed by the one or more processors, cause the apparatus to determine, based on the generated result, current sales data and historical sales data and determine, based on comparing the current sales data and the historical sales data, a change of the product sales data over the predetermined time period.

In yet another additional embodiment of the invention, the number of nodes identified in each of the hyperedges is the same.

In still another additional embodiment of the invention, the instructions, when executed by the one or more processors, cause the apparatus to generate the result by recursively decomposing the query to generate at least one sub-query and a set of operations, executing each of the at least one sub-query to generate a set of intermediate results, and aggregating each of the intermediate results based on the set of operations.

In yet still another additional embodiment of the invention, the instructions, when executed by the one or more processors, cause the apparatus to generate, based on determining at least one additional dimension related to the generated result that is not identified in the query, a second result by aggregating one or more nodes of the plurality of DAGs including the DAG corresponding to the at least one additional dimension.

Yet another embodiment of the invention includes a non-transitory machine-readable medium storing instructions that, when executed by one or more processors, cause the one or more processors to perform steps including receiving a query indicating one or more dimensions of a data store, identifying, based on the one or more dimensions, a plurality of directed acyclic graphs (DAGs) corresponding to the one or more dimensions, wherein each DAG includes a representation of a hierarchical structure within the dimensions, each DAG includes a plurality of nodes corresponding to a plurality of members of the corresponding dimension, and the plurality of DAGs include a plurality of hyperedges, each hyperedge corresponding to a unique combination including at least one node from each of the plurality of DAGs, generating a result by aggregating one or more nodes of the plurality of DAGs, wherein the aggregating includes selecting one or more hyperedges based on performing a plurality of graph traversals of the plurality of DAGs and retrieving, based on the selected one or more hyperedges, data including numerical values of the selected one or more hyperedges, and determining the result based on numerical values associated with the selected one or more hyperedges, and sending, to a computing device, the generated result.

In yet another embodiment of the invention, the aggregating includes identifying at least one hyperedge that is not indicated in the data store and the generating the result includes calculating a Cartesian product of all contributing sink nodes to at least one hyperedge that is not indicated in the data store.

In still another embodiment of the invention, the query further indicates an aggregation of product sales data over a predetermined time period and the instructions, when executed by the one or more processors, cause the one or more processors to perform steps including determining, based on the generated result, current sales data and historical sales data and determining, based on comparing the current sales data and the historical sales data, a change in the product sales data over the predetermined time period.

In yet still another embodiment of the invention, the generating the result by aggregating the one or more nodes of the plurality of DAGs includes identifying a formula indicated in the query, decomposing the formula into a plurality of sub-formulas that are linked together by a single common reduced operation, and aggregating the one or more nodes by recursively applying the plurality of sub-formulas to the one or more nodes.

In yet another additional embodiment of the invention, the instructions, when executed by the one or more processors, cause the one or more processors to perform steps including generating, based on determining at least one additional dimension related to the generated result that is not identified in the query, a second result by aggregating one or more nodes of the plurality of DAGs including the DAG corresponding to the at least one additional dimension.

BRIEF DESCRIPTION OF THE DRAWINGS

The present disclosure is described by way of example and not limited in the accompanying figures in which like reference numerals indicate similar elements and in which.

DETAILED DESCRIPTION

Figure 1:
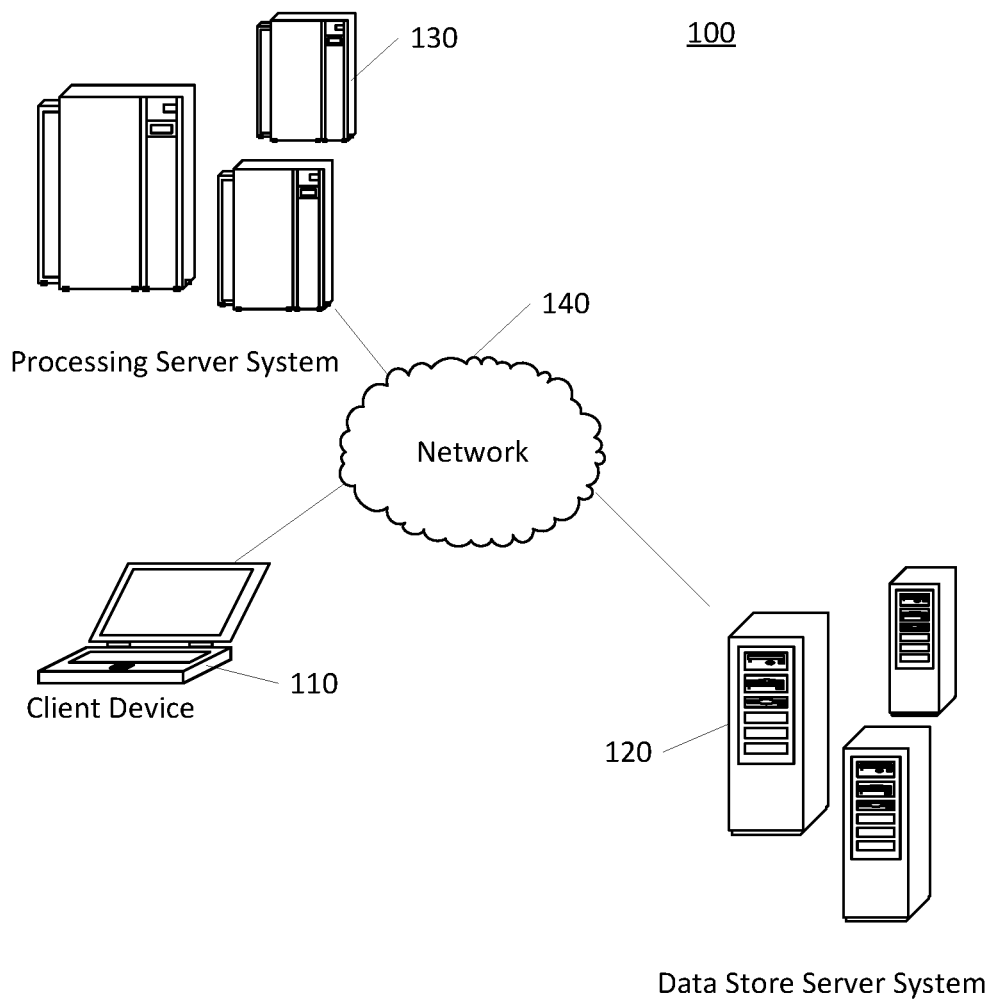
FIG. 1 shows an example of a control processing system in which one or more aspects described herein can be implemented.

In the following description of the various embodiments, reference is made to the accompanying drawings, which form a part hereof, and in which is shown by way of illustration various embodiments in which aspects of the disclosure can be practiced. It is to be understood that other embodiments can be utilized and structural and functional modifications can be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

Multidimensional databases typically include hierarchical relationships of data within each dimension. Existing techniques for multidimensional data analysis, including some open source products, rely on an On-Line Analytic Processing (OLAP) engine or OLAP cube. These techniques include looking at all, or a majority of the "intersections" between the dimensional hierarchies, and pre-aggregating or pre-computing the data along these intersections. Thus, techniques utilizing an OLAP cube can pre-compute all or a subset of the cuboids of the data cube in order to ensure adequate query performance. The static data cube can also need large amounts of memory and storage space. However, computing the data cube can be a large and time-consuming task and therefore, the pre-computed data can only be updated periodically and in batches, for example, on a nightly basis. Therefore, the latest data or information may not be available during data analysis and may not be included in the business decision process.

A graph can include nodes and edges connecting pairs of nodes, where the nodes can be any kind of object that is connected in pairs by edges and an edge connects two nodes. In the case of a directed graph, each edge has an orientation, from one node to another node. A path in a directed graph is a sequence of edges having the property that the ending node of each edge in the sequence is the same as the starting node of the next edge in the sequence. A cyclical path in a graph is a path that includes a duplicated node, such as a path that starts and ends on the same node. A directed acyclic graph (DAG) is a directed graph that has no cyclical paths. A sink node is a node with only incoming edges and no outgoing edges. A hypergraph is a generalization of graphs such that edges can connect two or more nodes.

Systems and methods disclosed herein can be used to perform a variety of processes by generating hierarchical DAG and hypergraph representations of large data stores. Implementations achieve tradeoffs between compute power, time to pre-aggregate, user experience when drilling down or rolling up, and the number of elements and levels allowed in the dimensions and hierarchies respectively. As pre-aggregation or pre-computation of data along dimensional hierarchies is not necessary, implementations allow the end user to perform data analysis as soon as the data is available. This approach also allows the end user to work with streaming data because the end user view can be updated in real time as the streaming data is processed. The end user can dynamically add or change hierarchies and see the impact in real time resulting in significant compute cost savings since only the necessary views are calculated. The end user can also re-specify the aggregation functions and view the output interactively. Implementations disclosed herein provide several functionalities for dynamic multidimensional analysis of consolidated data supporting end user analytical and navigational activities. These include calculations and modeling applied across dimensions, through hierarchies and/or across members, trend analysis over sequential time periods, slicing and dicing of subsets for analysis, drill-down to deeper levels of consolidation, reach-through to underlying details of data, rotation to new dimensional comparisons in the viewing area, calculated values, or members with derived formulas. Implementations also allow analysts to quickly and dynamically develop deep insight into the data as viewed through an arbitrary combination of dimensional hierarchies that can be updated in real time, thereby, saving time and compute costs, and allow analysts to gain insights that can otherwise be missed.

FIG. 1 shows an operating environment 100. The operating environment 100 can include at least one client device 110, at least one processing server system 130, and/or at least one data store server system 120 in communication via a network 140. It will be appreciated that the network connections shown are illustrative and any means of establishing a communications link between the computers can be used. The existence of any of various network protocols such as TCP/IP, Ethernet, FTP, HTTP and the like, and of various wireless communication technologies such as GSM, CDMA, WiFi, and LTE, is presumed, and the various computing devices described herein can be configured to communicate using any of these network protocols or technologies. Any of the devices and systems described herein can be implemented, in whole or in part, using one or more computing systems described with respect to FIG. 2.

Client devices 110 can provide queries and/or interact with data as described herein. Data store server systems 120 can store a variety of data, such as database tables, reports, and generated graph representations as described herein. Processing server systems 130 can exchange data with client devices 110, create graph-based representations of data stores, and/or generate query results as described herein. However, it should be noted that any computing device in the operating environment 100 can perform any of the processes and/or store any data as described herein. The processing server systems 130 and/or data store server systems 120 can be publicly accessible and/or have restricted access. Access to a particular server system can be limited to particular client devices 110. Some or all of the data described herein can be stored using one or more data stores. Data stores can include, but are not limited to relational databases, hierarchical databases, distributed databases, in-memory databases, flat file databases, XML databases, NoSQL databases, graph databases, and/or a combination thereof. Any file system can be used to store data using a database and/or flat file as appropriate. The network 140 can include a local area network (LAN), a wide area network (WAN), a wireless telecommunications network, and/or any other communication network or combination thereof The data transferred to and from various computing devices in operating environment 100 can include secure and sensitive data, such as confidential documents, customer personally identifiable information, and account data. Therefore, it can be desirable to protect transmissions of such data using secure network protocols and encryption, and/or to protect the integrity of the data when stored on the various computing devices. A file-based integration scheme or a service-based integration scheme can be utilized for transmitting data between the various computing devices. Data can be transmitted using various network communication protocols. Secure data transmission protocols and/or encryption can be used in file transfers to protect the integrity of the data such as, but not limited to, File Transfer Protocol (FTP), Secure File Transfer Protocol (SFTP), and/or Pretty Good Privacy (PGP) encryption. In many embodiments, one or more web services can be implemented within the various computing devices. Web services can be accessed by authorized external devices and users to support input, extraction, and manipulation of data between the various computing devices in the operating environment 100. Web services built to support a personalized display system can be cross-domain and/or cross-platform, and can be built for enterprise use. Data can be transmitted using the Secure Sockets Layer (SSL) or Transport Layer Security (TLS) protocol to provide secure connections between the computing devices. Web services can be implemented using the WS-Security standard, providing for secure SOAP messages using XML encryption. Specialized hardware can be used to provide secure web services. Secure network appliances can include built-in features such as hardware-accelerated SSL and HTTPS, WS-Security, and/or firewalls. Such specialized hardware can be installed and configured in the operating environment 100 in front of one or more computing devices such that any external devices can communicate directly with the specialized hardware.

Figure 2:
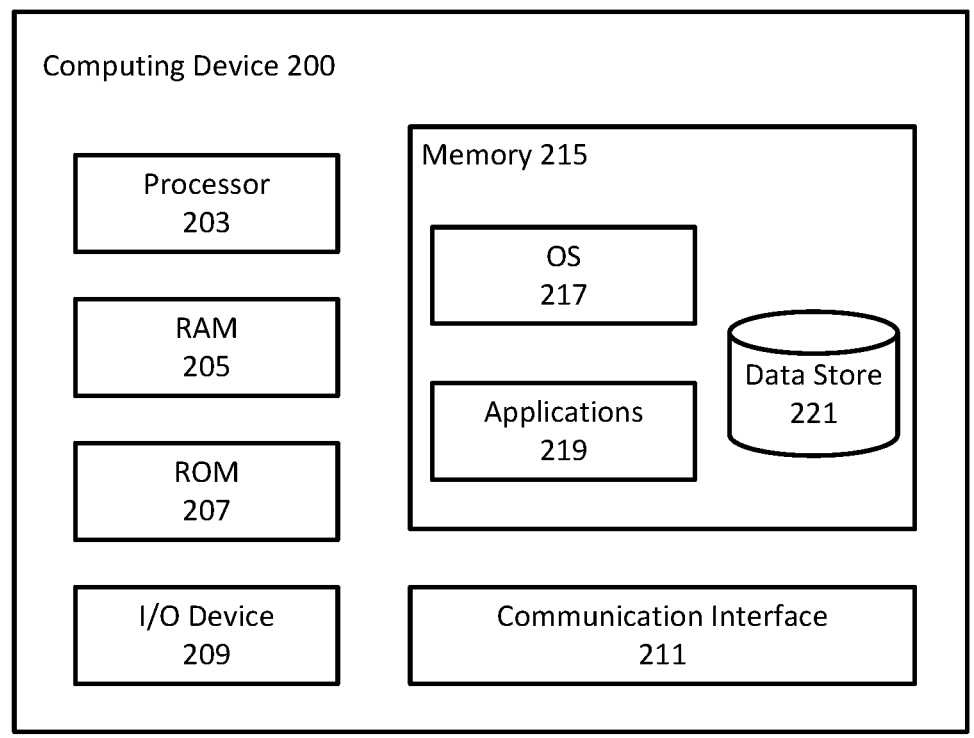
FIG. 2 shows an example computing device in accordance with one or more aspects described herein.

Turning now to FIG. 2, a conceptual illustration of a computing device 200 that can be used to perform any of the techniques as described herein is shown. The computing device 200 can include a processor 203 for controlling overall operation of the computing device 200 and its associated components, including RAM 205, ROM 207, input/output device 209, communication interface 211, and/or memory 215. A data bus can interconnect processor(s) 203, RAM 205, ROM 207, memory 215, I/O device 209, and/or communication interface 211. In some embodiments, computing device 200 can represent, be incorporated in, and/or include various devices such as a desktop computer, a computer server, a mobile device, such as a laptop computer, a tablet computer, a smart phone, any other types of mobile computing devices, and the like, and/or any other type of data processing device.

Input/output (I/O) device 209 can include a microphone, keypad, touch screen, and/or stylus through which a user of the computing device 200 can provide input, and can also include one or more of a speaker for providing audio output and a video display device for providing textual, audiovisual, and/or graphical output. Software can be stored within memory 215 to provide instructions to processor 203 allowing computing device 200 to perform various actions. Memory 215 can store software used by the computing device 200, such as an operating system 217, application programs 219, and/or one or more data stores 221. The various hardware memory units in memory 215 can include volatile and nonvolatile, removable and non-removable media implemented in any method or technology for storage of information such as computer-readable instructions, data structures, program modules, or other data. Memory 215 can include one or more physical persistent memory devices and/or one or more non-persistent memory devices. Memory 215 can include, but is not limited to, random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that can be used to store the desired information and that can be accessed by processor 203.

Communication interface 211 can include one or more transceivers, digital signal processors, and/or additional circuitry and software for communicating via any network, wired or wireless, using any protocol as described herein. It will be appreciated that the network connections shown are illustrative and any means of establishing a communications link between the computers can be used. The existence of any of various network protocols such as TCP/IP, Ethernet, FTP, HTTP and the like, and of various wireless communication technologies such as GSM, CDMA, WiFi, and LTE, is presumed, and the various computing devices described herein can be configured to communicate using any of these network protocols or technologies.

Processor 203 can include a single central processing unit (CPU) (and/or graphic processing unit (GPU)), which can include a single-core or multi-core processor along with multiple processors. Processor(s) 203 and associated components can allow the computing device 200 to execute a series of computer-readable instructions to perform some or all of the processes described herein. Although not shown in FIG. 2, various elements within memory 215 or other components in computing device 200, can include one or more caches including, but not limited to, CPU caches used by the processor 203, page caches used by the operating system 217, disk caches of a hard drive, and/or database caches used to cache content from data store 221. For embodiments including a CPU cache, the CPU cache can be used by one or more processors 203 to reduce memory latency and access time. A processor 203 can retrieve data from or write data to the CPU cache rather than reading/writing to memory 215, which can improve the speed of these operations. In some examples, a database cache can be created in which certain data from a data store 221 is cached in a separate smaller database in a memory separate from the data store, such as in RAM 205 or on a separate computing device. For instance, in a multi-tiered application, a database cache on an application server can reduce data retrieval and data manipulation time by not needing to communicate over a network with a back-end database server. These types of caches and others can be included in various embodiments, and can provide potential advantages in certain implementations of devices, systems, and methods described herein, such as faster response times and less dependence on network conditions when transmitting and receiving data.

Any data described and/or transmitted herein can include secure and sensitive data, such as confidential documents, customer personally identifiable information, and account data. Therefore, it can be desirable to protect transmissions of such data using secure network protocols and encryption, and/or to protect the integrity of the data when stored on the various computing devices. For example, a file-based integration scheme or a service-based integration scheme can be utilized for transmitting data between the various computing devices. Data can be transmitted using various network communication protocols. Secure data transmission protocols and/or encryption can be used in file transfers to protect the integrity of the data, for example, File Transfer Protocol (FTP), Secure File Transfer Protocol (SFTP), and/or Pretty Good Privacy (PGP) encryption. In many embodiments, one or more web services can be implemented within the various computing devices. Web services can be accessed by authorized external devices and users to support input, extraction, and manipulation of data between the various computing devices in the system 200. Web services built to support a personalized display system can be cross-domain and/or cross-platform, and can be built for enterprise use. Data can be transmitted using the Secure Sockets Layer (SSL) or Transport Layer Security (TLS) protocol to provide secure connections between the computing devices. Web services can be implemented using the WS-Security standard, providing for secure SOAP messages using XML encryption. Specialized hardware can be used to provide secure web services. For example, secure network appliances can include built-in features such as hardware-accelerated SSL and HTTPS, WS-Security, and/or firewalls. Such specialized hardware can be installed and configured in the system 200 in front of one or more computing devices such that any external devices can communicate directly with the specialized hardware.

Although various components of computing device 200 are described separately, functionality of the various components can be combined and/or performed by a single component and/or multiple computing devices in communication without departing from the invention.

Figure 3:
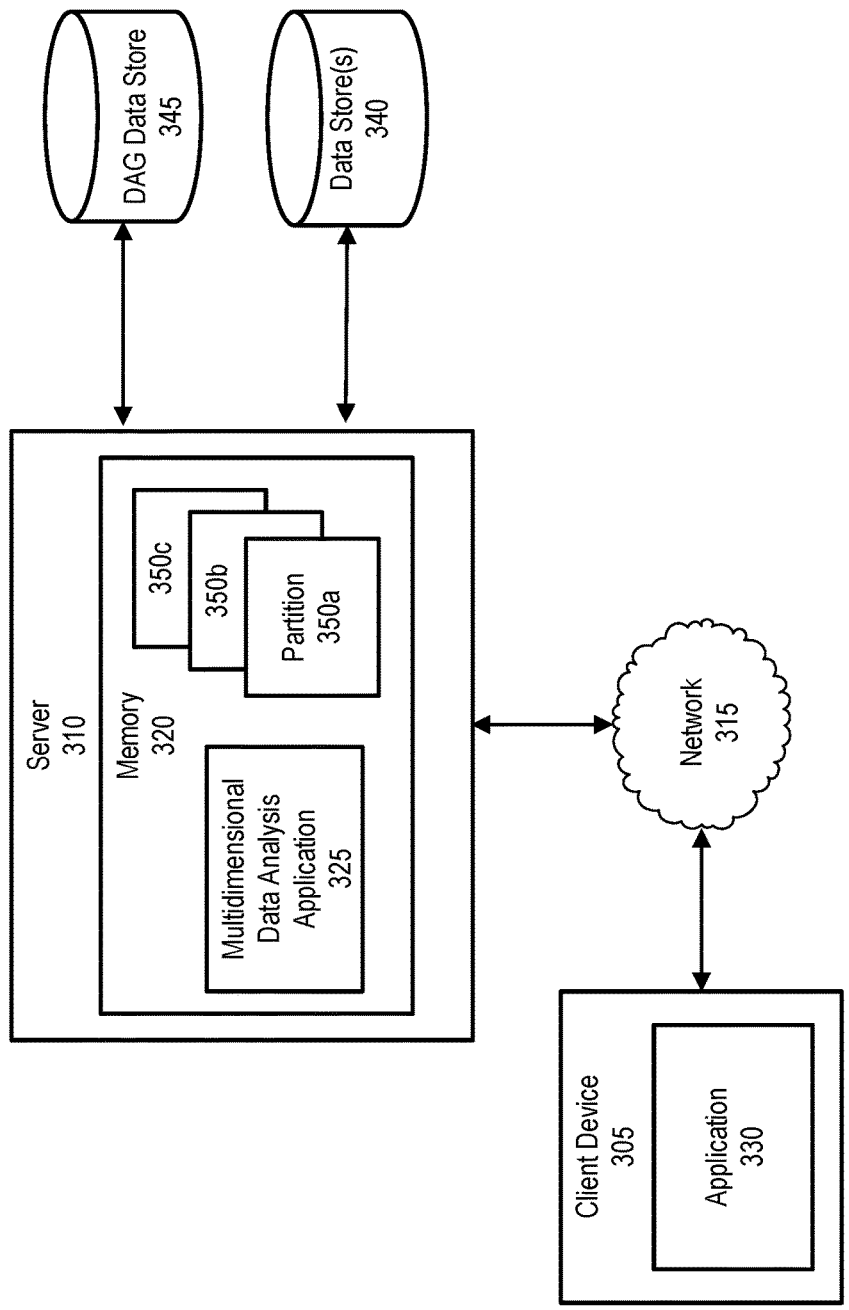
FIG. 3 shows an example system for query processing of multidimensional hierarchical data in accordance with one or more aspects described herein.

FIG. 3 shows an example system 300 for providing multidimensional hierarchical data analysis. The system 300 includes a client device 305 and a server 310 interconnected via a network 315. The client device 305 can be any one of the devices described herein. In this regard, the client device 305 can include a memory (not shown). The memory can include one or more applications, such as a data analysis and visualization application 325. The server 310 can be any suitable computing device or any combination thereof as described herein.

Server 310 can include a memory 320. Memory 320 can include, but is not limited to, random access memory (RAM), read only memory (ROM), electronically erasable programmable read only memory (EEPROM), flash memory or other memory technology, hard disk, optical disk storage, magnetic cassettes, magnetic tape, magnetic disk storage or other magnetic storage devices, or any other medium that can be used to store the desired information and that can be accessed by a processor of the server 310. In several embodiments, some or all of the data stored in memory 320, such as partitions 350a-c, is accessed remotely from data stores 340. Memory 320 of the server 310 can include one or more applications, such as a multidimensional data analysis application 325. The multidimensional data analysis application 325 can perform multidimensional hierarchical data analysis. The multidimensional data analysis application 325 can interface with one or more data stores, such as the data store(s) 340 and the DAG data store 345. The data stores 340 can include data associated with various observations or transactions. The transactions can in turn have dimensions. A dimensional hierarchy organizes the members of a dimension into a graph structure that defines parent-child aggregation relationships, where parent members, aggregate members, correspond to the consolidation of child members. A dimensional hierarchy can be represented as a Directed Acyclic Graph (DAG). A node in a DAG can represent a member in the dimensional hierarchy. Each DAG can include a plurality of nodes corresponding to the members of the corresponding dimension. An edge between two nodes can represent a parent-child relationship between two members. A collection of DAGs corresponding to a plurality of dimensions can include one or more hyperedges. Each hyperedge can correspond to a unique combination that includes at least one node from each of the DAGs. The multidimensional data analysis application 325 can generate DAG representations of the hierarchies within one or more dimensions of the data stores 340. The DAG representations can be stored in the DAG data store 345.

For example, a user can, via the data analysis and visualization application 330 executing on the client device 305, submit a query associated with data in the data stores 340. The query can be transmitted from the client device 305 to the server 310. The server 310 can receive the query and based on the query, identify one or more dimensions of the data store 340. The server 310 can identify, based on the one or more dimensions, a plurality of directed acyclic graphs (DAGs) corresponding to the identified one or more dimensions stored in the DAG data store 345. The server 310 can retrieve information associated with the one or more identified DAGs and generate a response to the obtained query. The server 310 can provide the generated response to the client device 305 for analysis and/or processing as appropriate.

Figure 4A:
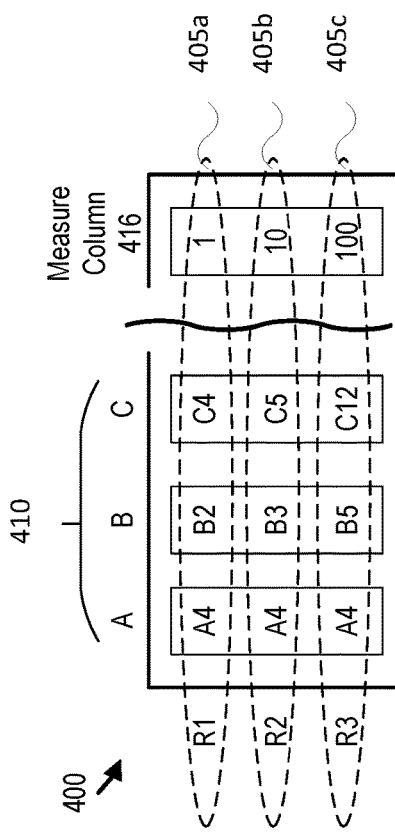
FIG. 4A shows an example database table indicating information about DAGs, dimensions, and hyperedges in accordance with one or more aspects described herein.

The information associated with the one or more identified DAGs can be included in a database table 400 shown in FIG. 4A. The database table 400 can include columns 410 that indicate the dimensions associated with data stored in one or more data stores. Each of the identified DAGs can correspond to one of the columns 410 that can include entries of the DAG that are sink nodes. The dimensions can be indicated in a query by a blank or a wildcard. A DAG representation of a hierarchy within a dimension A of the data can correspond to the first column of the columns 410 that includes three entries, each identifying the node A4 of the DAG. Similarly, a DAG representation of a hierarchy within a dimension B can correspond to the second column of the columns 410 that includes three entries identifying the nodes B2, B3, and B5, of the DAG. A DAG representation of a hierarchy within a dimension C can correspond to the third column 410 that includes three entries identifying the nodes C4, C5, and C12, of the DAG.

The edges of a DAG can be associated with arithmetic operations such as, but not limited to, addition (+), subtraction (−), and ignore (~). These operations can be encoded in a variety of ways, such as 1, −1, and 0 respectively. Additionally, one or more hyperedges can be associated with the DAGs. The database table 400 can include rows, such as a first row 405a, a second row 405b, and a third row 405c (collectively referred to as rows 405). The rows 405 can be associated with hyperedges R1, R2, and R3. For example, the first row is associated with a hyperedge R1 spanning nodes A4, B2, and C4 of dimensions A, B, and C.

The hyperedges can represent relationships that span across the dimensions associated with the DAGs. A unique combination of nodes identified in the columns 410 can define one hyperedge representing a relationship that spans across the dimensional DAG representations shown in FIGS. 4B-D. As shown in FIG. 4A, the database table 400 also includes a measure column 416 that includes numeric values for hyperedges associated with the identified DAG nodes. The measure column can indicate numeric values used for creating reports, for example, amounts, counts, magnitude scales, and the like. The numeric values can be utilized during aggregation as discussed in more detail below. For example, the hyperedge R1 has a measure value 416 of 1.

As discussed herein, the DAG representations can express the hierarchical structure within each dimension of data stored using one or more data stores. Each dimension can be defined as an edge list. Each DAG representation can include a plurality of nodes and edges. The nodes can include one source node, one or more non-sink nodes, and/or one or more sink nodes. Each node can be unique to its corresponding DAG.

An aggregation can be determined based on the identified DAGs. Determining an aggregation can include determining a hyperedge that is not found in the data record. For example, a hyperedge that is not indicated in the database table 400 shown in FIG. 4A can span the dimensions A, B, and C and include the nodes A1, B1, and C3. Utilizing a variety of techniques as discussed in more detail herein, a mapping from a node to all sink nodes that are reachable from that given node can be determined. Due to the acyclicity of the DAG, a similar mapping can be done for any node along any path from the source node to a sink node.

Figure 4D:
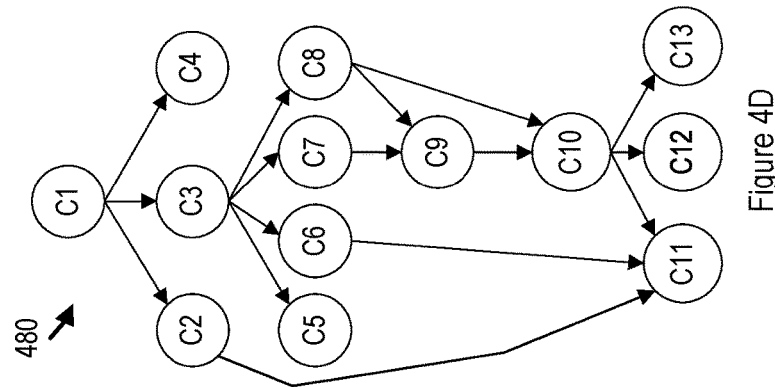
FIGS. 4B-D show various dimensional DAGs in accordance with one or more aspects described herein.
Figure 4C:
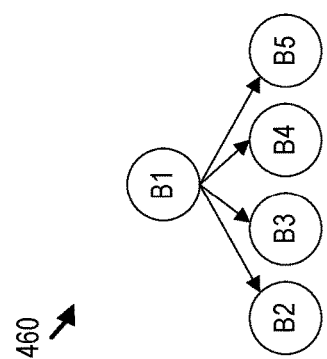
Figure 4B:
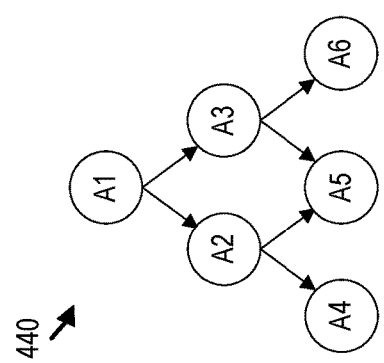

FIG. 4B shows the DAG 440 associated with dimension A. DAG 440 includes nodes A1, A2, A3, A4, A5, and A6. The node A1 is the source node. The DAG 440 includes a plurality of edges between the nodes. For example, the DAG 440 includes two edges from the source node A1 to the nodes A2 and A3, two edges from the node A2 to the nodes A4 and A5, and two edges from the node A3 to the nodes A5 and A6.

FIG. 4C shows the DAG 460 associated with dimension B. DAG 460 includes nodes B1, B2, B3, B4, and B5. The node B1 is the source node. The DAG 460 includes a plurality of edges between the nodes. For example, the DAG 440 includes four edges from the source node B1 to the nodes B2, B3, B4, and B5.

FIG. 4D shows a DAG 480 associated with dimension C. DAG 480 includes a source node C1 and nodes C2-C13. The DAG 480 includes a plurality of edges between the nodes. For example, the DAG 440 includes three edges from the source node C1 to the nodes C2, C3, and C4, one edge from the node C2 to node C11, four edges from the node C3 to the nodes C5-C8, one edge from the node C6 to the node C11, one edge from the node C7 to the node C9, two edges from the node C8 to the nodes C9 and C10, one edge from the node C9 to the node C10, and three edges from the node C10 to the nodes C11, C12, and C13.

A hypergraph is a generalization of graphs such that a hyperedge can connect two or more nodes. Generating a response to a query can include determining hyperedges indicated within a data store within the graphs and/or identifying hyperedges not indicated in the data store.

Figure 5:
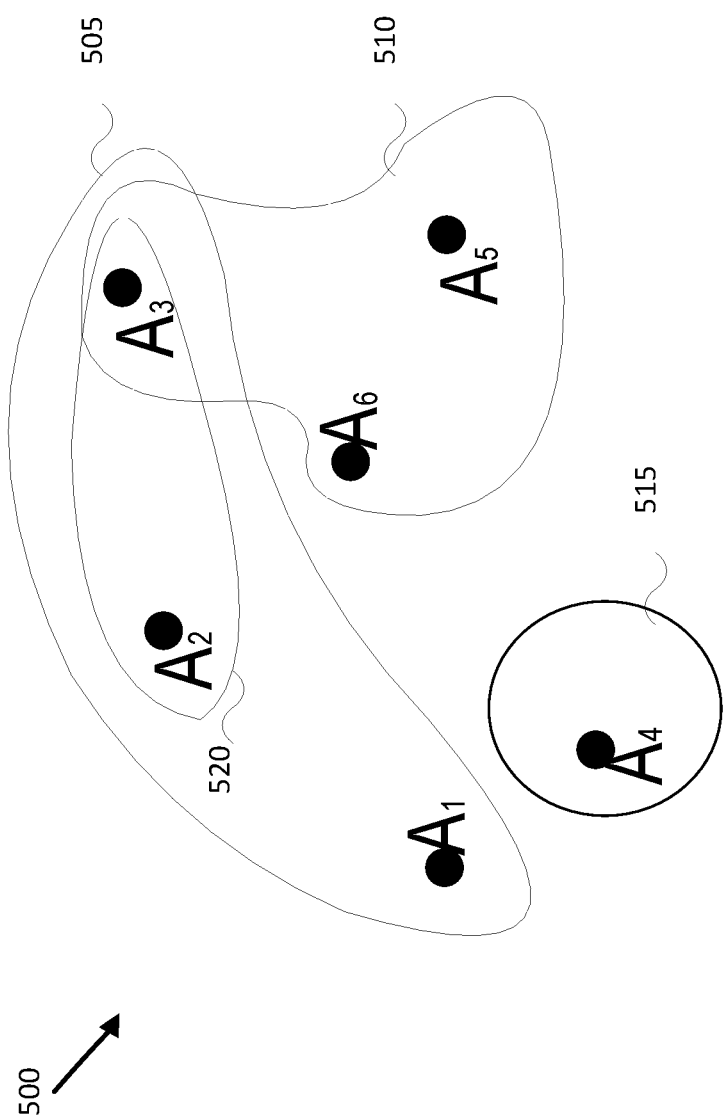
FIG. 5 shows an example visualization of hypergraphs utilizing Euler diagrams in accordance with one or more aspects described herein.

FIG. 5 shows an example of an Euler diagram 500 of the hyperedges 505, 510, 515, and 520 of a hypergraph 500 with nodes A1-A6. The diagram 500 shows four hyperedges 505, 510, 515, and 520. The first hyperedge 505 includes nodes A1, A2, and A3. The second hyperedge 510 includes nodes A3, A5, and A6. The third hyperedge 515 includes node A4. The fourth hyperedge set 520 includes nodes A2 and A3.

A bipartite graph can represent mappings between nodes of graphs separated into two disjoint sets such that each edge connects a node in the first set to a node in the second set. A semiregular graph can be generated by mapping a source node to all sink nodes reachable from the source node. The source node and all sink nodes are the two disjoint sets.

Figure 6B:
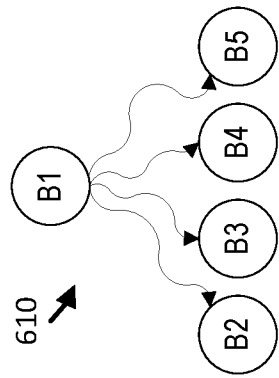
FIGS. 6A-B show bipartite representations for dimensional DAGs in accordance with one or more aspects described herein.
Figure 6A:
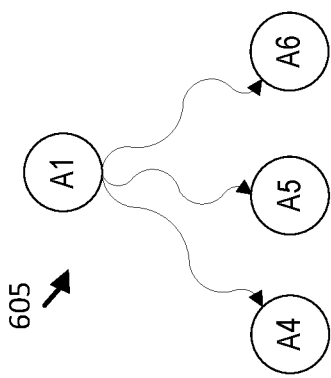

FIG. 6A shows a bipartite graph 605 for the dimensional DAG 440 shown in FIG. 4B. The bipartite graph 605 shows edges between the source node A1 to other nodes denoting that a path exists from the source node A1 of the DAG to the sink nodes A4, A5, and A6 of the DAG. FIG. 6B shows a bipartite graph 610 for the initial dimensional DAG 460 shown in FIG. 4C. The bipartite graph 610 shows edges between the nodes of the DAG denoting paths that exist from the source node B1 of the DAG 460 to the sink nodes B2, B3, B4, and B5 of the DAG.

Figure 7A:
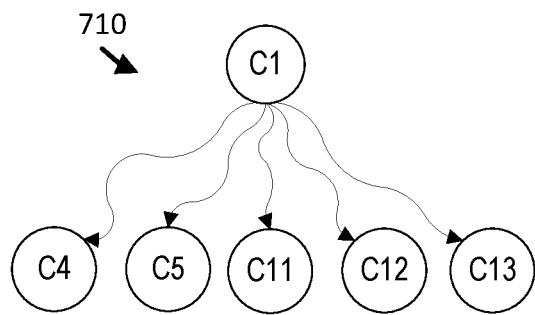
FIGS. 7A-C shows bipartite representations for a dimensional DAG in accordance with one or more aspects described herein.
Figure 7B:
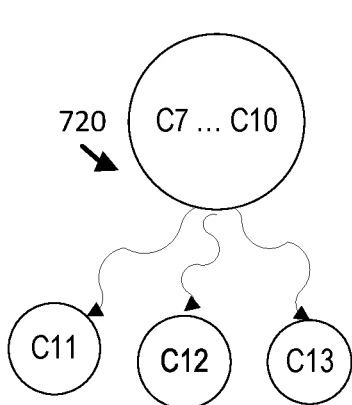
Figure 7C:
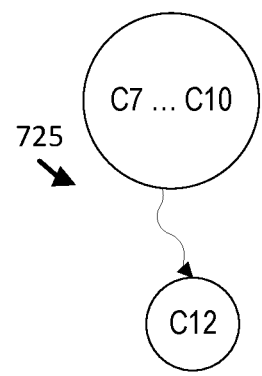

FIGS. 7A-C shows bipartite graphs for the initial dimensional DAG 480 shown in FIG. 4D. In FIG. 7A, the bipartite graph 710 shows edges between nodes of the DAG denoting paths existing from the source node C1 of the DAG to sink nodes C4, C5, C11, C12 and C13 of the DAG. In FIG. 7B, the bipartite graph 720 shows edges denoting paths that exist starting from the nodes C7, C8, C9, or C10 of the DAG to the sink nodes C11, C12, and C13 of the DAG. In FIG. 7C, the graph 725 illustrates the paths that exist from the nodes C7, C8, C9, or C10 to the sink node C12, wherein C12 remains in this reduced bipartite graph because it exists as a value in column C of data table 400.

Figure 8:
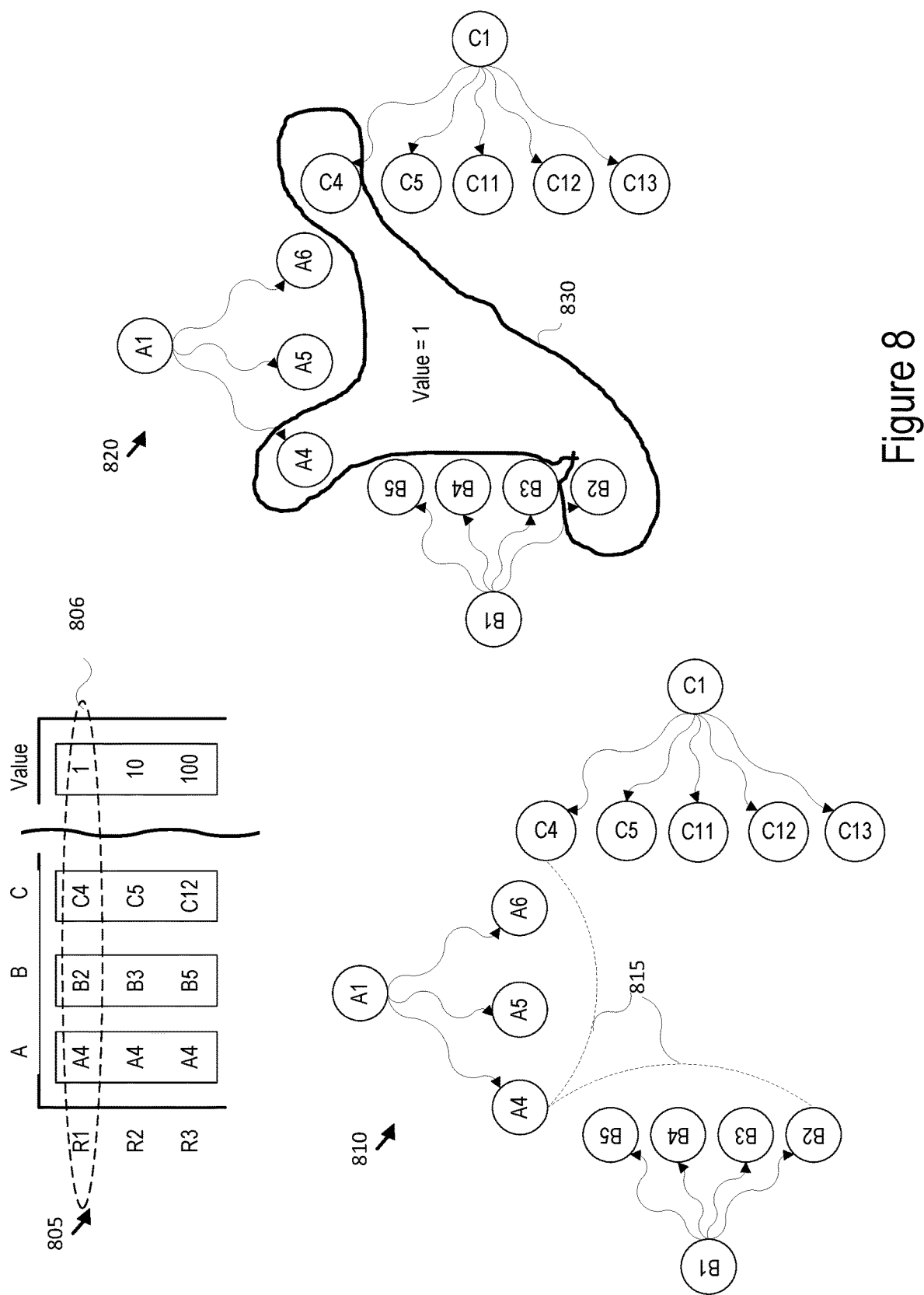
FIG. 8 shows examples of visualizing hyperedges in accordance with one or more aspects described herein.

FIG. 8 shows two different visualizations of hyperedges across different graphs. Database table 805 includes data records R1, R2, and R3. The visualization 810 is generated based on the semiregular bipartite graphs generated for dimensions A, B, and C of the database table 805 as described herein. The hyperedge 806 corresponding to the data record R1 is shown in the visualization 810 by the hyperedge 815 connecting nodes A4, C4, and B2. The visualization 820 is generated utilizing the diagram approach discussed herein with reference to FIG. 5. The visualization 820 shows the hyperedge 806 corresponding to the data record R1 as hyperedge 830 including the nodes A4, B2, and C4.

Figure 9:
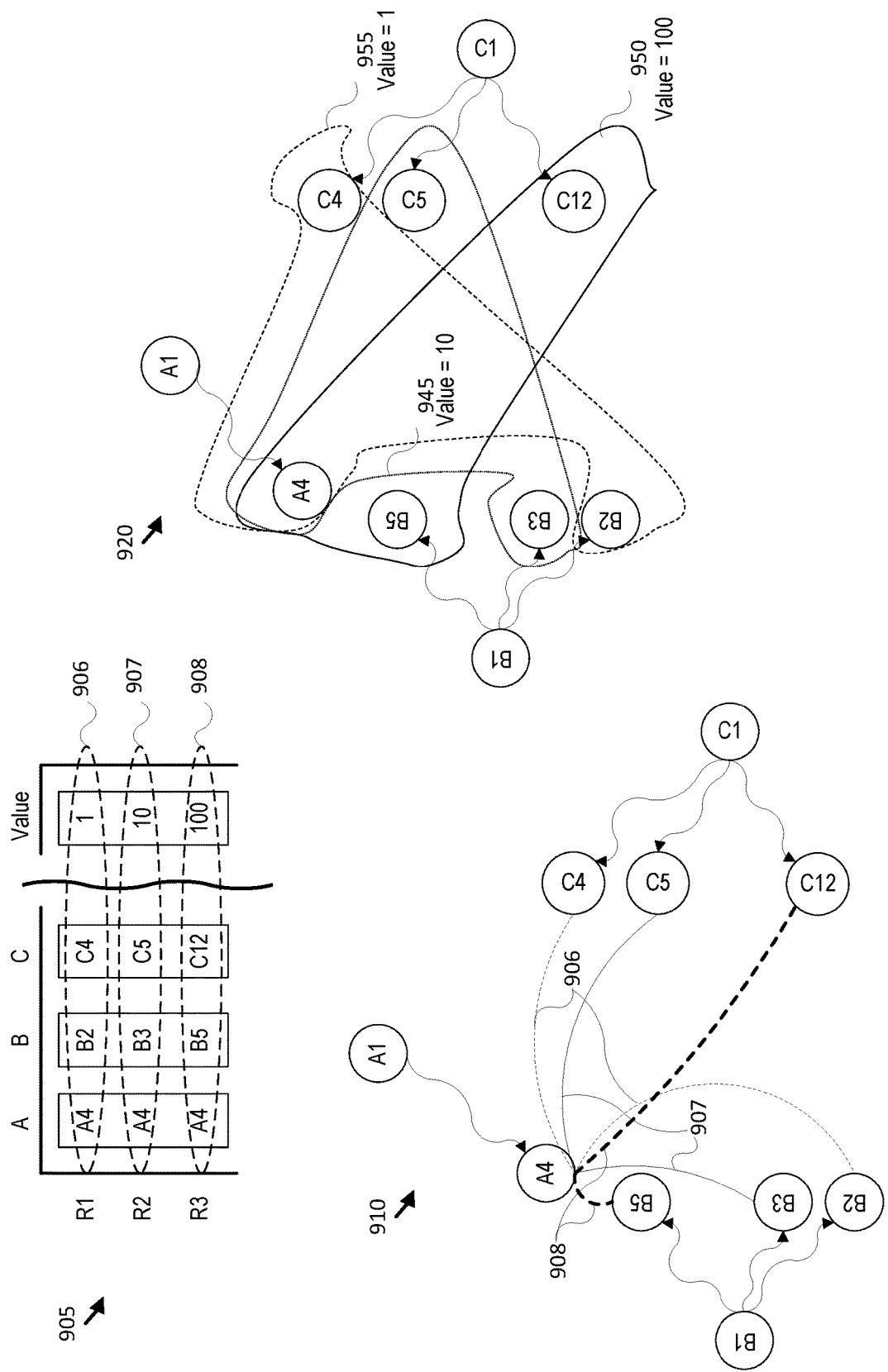
FIG. 9 shows examples of visualizing hyperedges based on further reduced DAGs in accordance with one or more aspects described herein.

FIG. 9 shows two different visualizations of hyperedges on further reduced DAGs. Database table 905 includes data records R1, R2, and R3. The visualization 910 is generated based on bipartite graphs generated for dimensions A, B, and C of the database table 905. The hyperedge 906 corresponding to the data record R1 is shown in the visualization 910 connecting nodes A4, C4, and B2. The hyperedge 907 corresponding to the data record R2 is shown in the visualization 910 by lines connecting nodes A4, C5, and B3. The hyperedge 908 corresponding to the data record R3 is shown in the visualization 910 by the line connecting nodes A4, B5, and C12. The visualization 920 is generated utilizing the diagram approach discussed herein with reference to FIG. 5. The visualization 920 shows the hyperedge corresponding to the data record R1 as a set 955 including the nodes A4, B2, and C4. The visualization 920 shows the hyperedge corresponding to the data record R3 as a set 950 including the nodes A4, B5, and C12. The visualization 920 shows the hyperedge 908 corresponding to the data record R2 as a set 945 including the nodes A4, B3, and C5.

Graphs can identify mappings from a source node of a dimensional DAG to all sink nodes that are reachable from that source node. Due to the acyclicity of the DAG, a similar mapping can be determined for any node along any path from the source node to a sink node. Reachable nodes can also be found by utilizing a variety of graph traversal algorithms, such that only nodes that are reachable and can contribute arithmetically are included and encoded. The graph traversal can start at the root node of the DAG and continue as far as possible along each branch of the DAG before continuing to the next branch. To do aggregation for any node in a dimensional DAG, the graph can be traversed the from the aggregation node to all its lowest level nodes. The edges of a DAG can be associated with arithmetic operations, such as addition (+), subtraction (−), and ignore (~) which can be encoded as 1, −1, and 0 as described herein. During the traversal of the DAG from the aggregation node to all its lowest level nodes (e.g. sink nodes), consolidation operators (e.g. edge values along each path) are reduced to a single result that indicates for each of the sink nodes, the contribution of that sink node to the aggregation. If, during the traversal, an ignore (~) operator is encountered along a path, then the evaluation or traversal of that path can be stopped early because the sink nodes that can be found by continuing the traversal will have no impact on the aggregation. The result of a traversal of the DAG from an aggregation node is that all the sink nodes that can contribute to the aggregation node's result or value are classified as either positive or negative corresponding to addition (+) and subtraction (−) operations. The values of the hyperedges derived from the combination of each dimension's sink nodes (such as via a Cartesian product of filtered classified nodes) can be reduced and returned as the aggregation node's result or value. In this manner, graph traversal processes in accordance with aspects of the disclosure can determine nodes that are reachable and can reduce aggregations across multidimensional hierarchies. This can improve the functionality and efficiency of a computing device by reducing the number of operations that need to be performed, thereby speeding up aggregation operations for multi-dimensional hierarchies, Additionally, these operations can be parallelized, greatly improving the efficiency and throughput of computing devices performing the operations.

Once the reachable nodes are found utilizing the graph traversal processes discussed herein, an intersection can be determined between a set including the reachable nodes and the set of values in the dimensions of a data store in order to reduce the problem space cardinality. For example, referring back to mapping 720 of FIG. 7B, the edges denote paths that exist from the nodes C7, C8, C9, or C10 to the sink nodes C11, C12, and C13. The intersection of these reachable sink nodes C11, C12, and C13 results in a single sink node C12. This is because the sink nodes C11 and C13 are not found in the corresponding database table 400 in FIG. 4A, and are therefore removed, leaving only the sink node C12. Referring back to FIG. 7C, in the mapping 725, an edge denotes a path that exists from the nodes C7, C8, C9, or C10 to the sink node C12.

Performing an aggregation can include determining a hyperedge that contains non-sink nodes and therefore, does not exist as a data record in a data store. The aggregation can include placing constraints requiring that a hyperedge contain exactly one node from each dimensional DAG. However, it should be noted that more than one node from a DAG can be used in accordance with aspects of the disclosure. Based on these constraints, a mapping of reachable and contributing nodes from this hyperedge can be determined by leveraging the mapping based on bipartite graphs via the graph traversal processes described herein. The aggregation can also include calculating a Cartesian product of all contributing sink nodes to at least one hyperedge that is not indicated in the data store. To create relevant hyperedges found as data records the Cartesian product of the node sets can be combined with the corresponding label encoded arithmetic operations as discussed herein.

Figure 10:
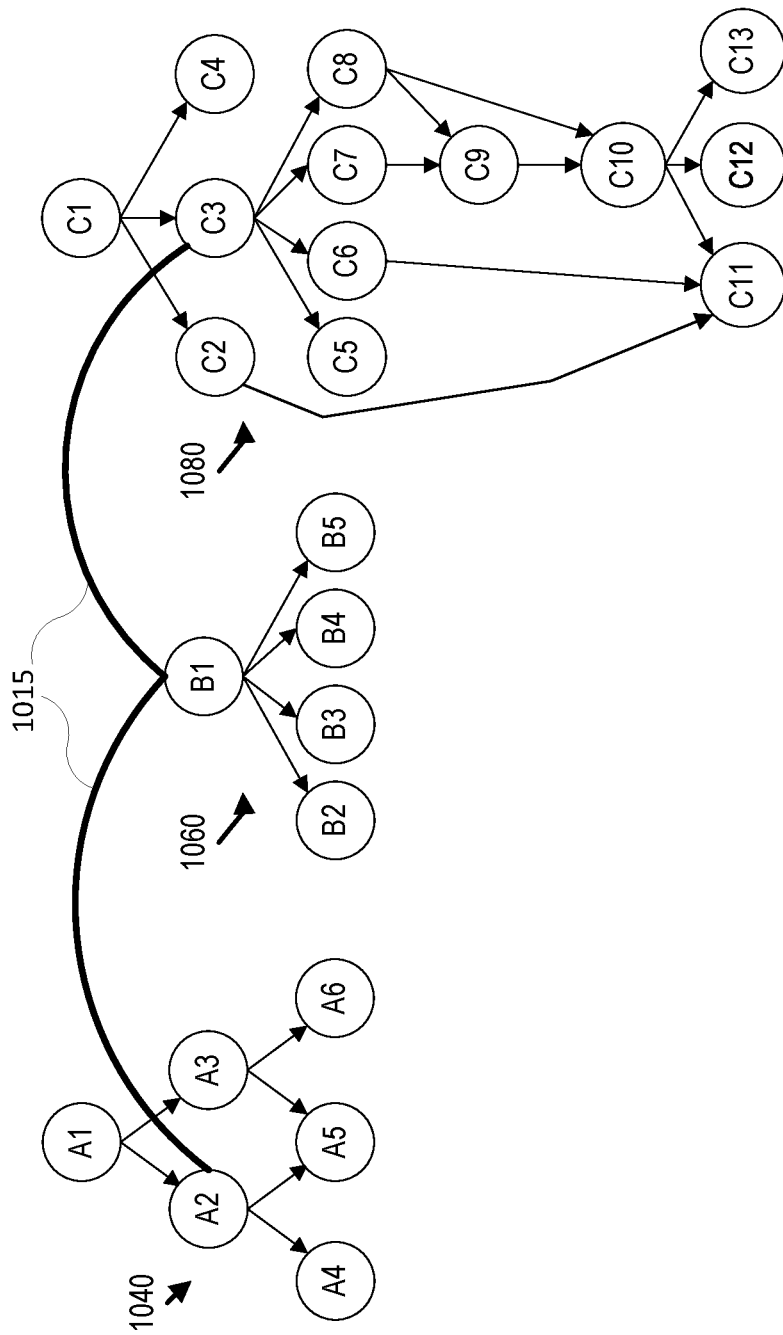
FIG. 10 shows a hyperedge resolved based on an aggregation across dimensional DAGs in accordance with one or more aspects described herein.
Figure 11:
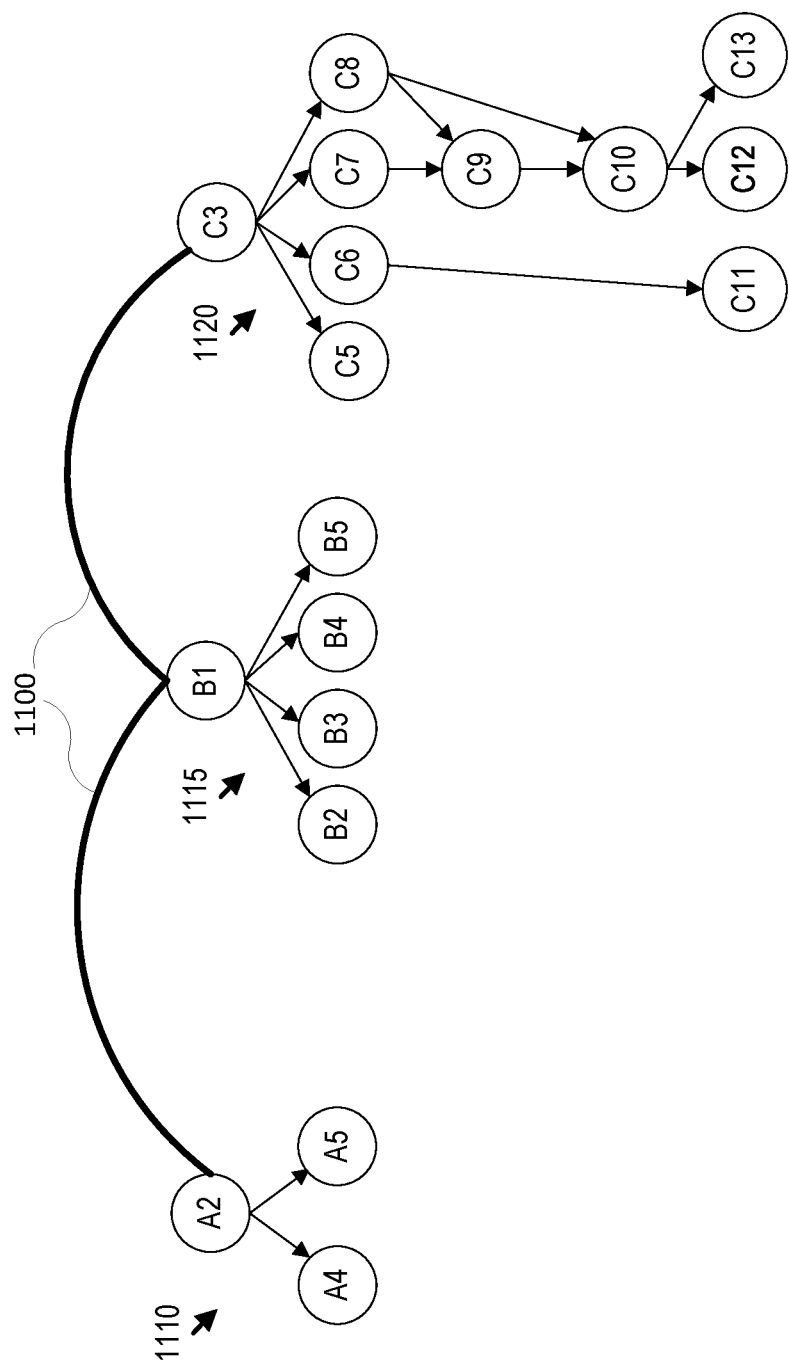
FIG. 11 shows the hyperedge across the hypergraphs for dimensional DAGs in accordance with one or more aspects described herein.
Figure 12:
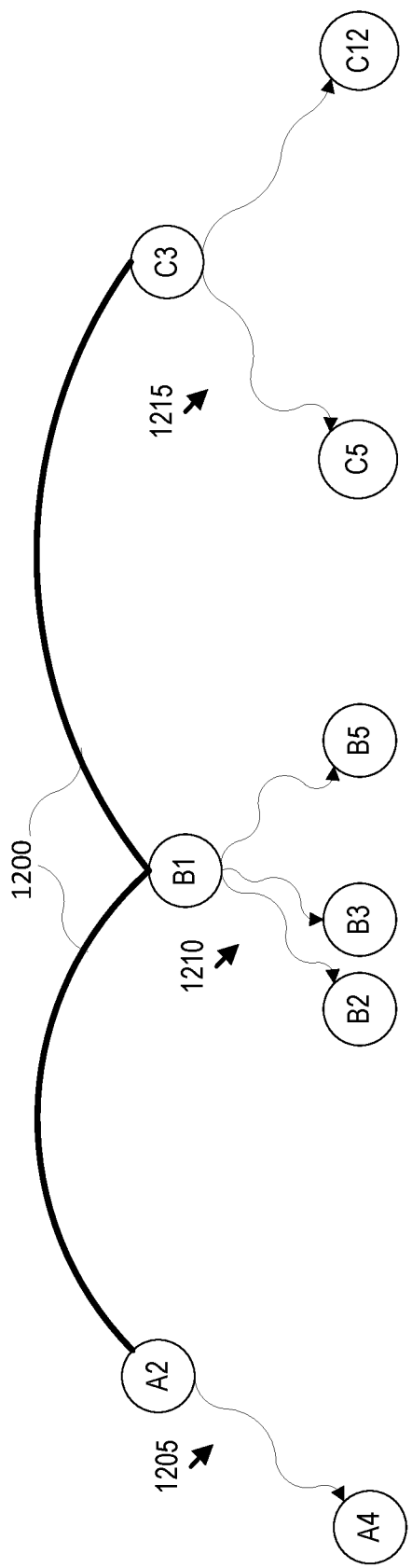
FIG. 12 shows reachable nodes found with a graph traversal algorithm in accordance with one or more aspects described herein.

A query can indicate one or more source nodes within the dimensional DAGs that can be used as the starting point to traverse the dimensional DAGs to identify one or more sink nodes that can be used to generate a response to the query. FIGS. 10-12 illustrate an example of an aggregation with respect to the dimensional DAGs. As discussed herein, an aggregation can resolve a hyperedge across the dimensional DAGs that does not exist in the data record.

FIG. 10 shows an example of a hyperedge that contains non-sink nodes A2, B1, and C3 of the dimensional DAGs 440, 460, and 480 shown in FIGS. 4B-D. The hyperedge 1015 is shown as a connection between the node A2 of the dimensional DAG 1040, the node B1 of the dimensional DAG 1060, and node C3 of the dimensional DAG 1080. As the hyperedge 1015 contains non-sink nodes, it would not exist as a data record in a data store. However, the hyperedge 1015 has a node in each graph 1040, 1060, and 1080 and corresponds to a valid hyperedge. As described in more detail herein, the hyperedge 1015 can be used to generate a result to a query including dimensions associated with each of the dimensional DAGs. The aggregation can include determining a mapping from a node in a dimensional DAG to all sink nodes in that DAG that are reachable from that given node.

It should be noted that the entry point into a dimensional DAG for a query can be any node in the dimensional DAG. FIG. 11 shows the hyperedge 1100 in relation to dimensional DAGs 1110, 1115, and 1120 showing all nodes that are reachable from a given source node in the respective dimensional DAG. The hyperedge 1100 shows the connection between source nodes A2, B1, and C3. The aggregation can include determining the reachable nodes with a graph traversal algorithm, such as the methods described herein, and determining an intersection between the reachable sink nodes and the sink nodes in the database table. In a variety of embodiments, the hyperedge 1100 indicates the same information as hyperedge 1015 in FIG. 10 as the induced subgraphs that are reachable from hyperedge 1100 and hyperedge 1015 are equivalent.

FIG. 12 shows a result of utilizing a graph traversal algorithm on the graphs 1110, 1115, and 1120 to generate the bipartite graphs 1205, 1210, and 1215. The bipartite graph 1205 shows the reachable and contributing sink node from the node A2 is the sink node A4. The bipartite graph 1210 shows that the reachable and contributing sink nodes from the node B1 are the sink nodes B2, B3, and B5. The bipartite graph 1215 shows the reachable and contributing sink nodes from the node C3 are the sink nodes C5 and C12. Hyperedge 1200 indicates source nodes A2, B1, and C3. Hyperedge 1200 maps the hyperedge 1015, shown in FIG. 10, to the sink nodes (e.g. A4, B2, B3, B5, C5, and C12) that can contribute to the value of hyperedge 1015. In a variety of embodiments, the graphs 1205, 1210, and 1215 are generated by determining the sink nodes reachable from the source nodes A2, B1, and C3 indicated by hyperedge 1100 (or hyperedge 1015) that contribute to a requested query result as indicated by the operators associated with the sink nodes. For example, node A5 is present in graph 1110 in FIG. 11 but is not present in graph 1205 as node A5 is associated with an ignore operation such that it does not contribute to the query result corresponding to hyperedge 1015. Likewise, graph 1215 does not include sink nodes C11 or C13. In several embodiments, the graphs 1205, 1210, and/or 1215 are generated using a variety of graph traversal processes, such as those described with respect to FIG. 13.

In some aspects of the disclosure, the input data can be partitioned and a graph traversal can be used to select only needed partitions of the input data relevant to perform particular aggregations. As discussed herein, the input data can include measure values for combinations of values from each dimensional DAG, In some instances, the size of the input data can be larger than the storage capacity of the computing devices performing the aggregation. Therefore, the input data can be prepared and stored on disks in partitions, such as paged tables stored using a flat file database, based on the sink node values from the DAGs. To aggregate the measures for any combination of parent node values from the one or more dimensions, the graph traversal processes described herein can be utilized to determine the sink nodes involved. Only the partitions that include these sink nodes can be loaded into the memory for aggregation. This not only provides scalability and supports large input data, but also improves the performance of loading the input data and the performance of the aggregation based on the smaller data size.

Figure 13:
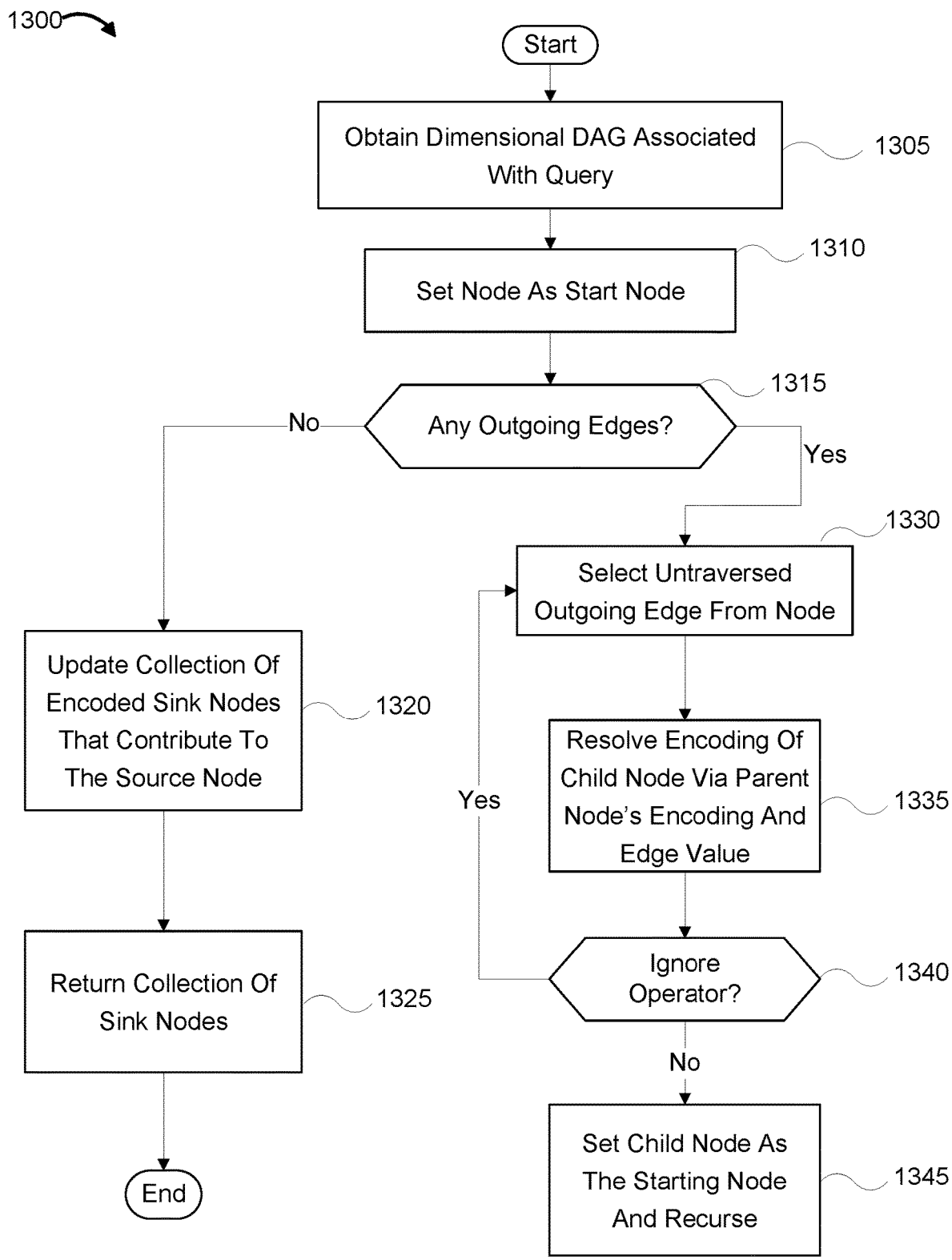
FIG. 13 shows a flow diagram of an example method for utilizing a graph traversal algorithm to determine aggregations across multiple DAGs in accordance with one or more aspects described herein.

FIG. 13 shows a flow diagram of an example method for utilizing a graph traversal algorithm to determine aggregations across multiple DAGs in accordance with one or more aspects described herein. Some or all of the steps of the process 1300 can be performed by one or more computing devices described herein. The steps of the process 1300 can be modified, omitted, and/or performed in other orders, and/or other steps added in accordance with aspects of the disclosure.

At step 1305, a computing device can obtain one or more dimensional DAGs associated with a query as described herein. A source node for the obtained dimensional DAG can be indicated by the query. At step 1310, the computing device can set the source node as the starting node. The starting node can indicate the location within the dimensional DAG at which the traversal should begin.

At step 1315, the computing device can determine the number of outgoing edges from the start node. As described herein, nodes within a dimensional DAG can be classified as a sink node (e.g. a node with no outgoing edges) or as a non-sink node (e.g. a node with one or more outgoing edges). If the start node has no outgoing edges, the process proceeds to step 1320. If the start node has outgoing edges, the process proceeds to step 1330.

At step 1320, the computing device can add the sink node to a collection of sink nodes associated with the start node. Adding the sink node to the collection of sink nodes can include adding the measure of the sink node along with any encoded operations associated with the edge connecting the current node to its parent node. In a variety of embodiments, only those sink nodes that are associated with an operation that contributes to the source node are included in the collection. For example, if the operation associated with the sink node is +, −, +1, or −1, the sink node can be added to the collection of encoded sink nodes, while a sink node with an ignore operation (e.g. ~ or 0) is not added to the collection of encoded sink nodes. At step 1325, the collection of sink nodes can be returned. Returning the collection of sink nodes can include transmitting the collection of sink nodes to a computing device, such as the computing device providing the query and/or dimensional DAG, for processing. In many embodiments, returning the collection of sink nodes can include storing the collection of sink nodes using a data store, such as a DAG data store.

At step 1330, an untraversed edge can be selected from the set of outgoing edges associated with the start node. An untraversed edge can be indicated by a flag (or any other indicator) associated with the edge. An untraversed edge can indicate that the edge has not been processed as part of process 1300. The untraversed edge can connect the start node to a child node.

At step 1335, an operation associated with the edge can be decoded. The operation associated with the edge can be processed to determine the operation associated with the child node indicated by the edge. Decoding the operation associated with the child node can be determined based on the operation associated with the edge along with the operation associated with the start node. For example, the value for the edge can be represented by a consolidation operator, such as, "+," "−," or "~," and can be encoded as "1," "−1," or "0" respectively. A traversal operation can be used to combine the operation associated with the edge and the operation associated with the start node to determine the operation associated with the child node. At step 1340, it can be determined if the child node should be processed. When an ignore (~) consolidation operator is associated with the child node, the processing of the child node can be skipped and the process can return to step 1330 to process the next outgoing edge. If no outgoing edges remain, the processing of the start node can end and the process can either recursively process the next node or end if no additional nodes remain for processing. If the child node is associated with a non-ignore operator, the process can proceed to step 1345. At step 1345, the process 1300 can be recursively performed, starting at step 1310, with the child node being set as the start node.

In a variety of embodiments, a query can be decomposed into atomic tasks linked by one or more operators. An atomic task can include a sub-query (or any other action) that can be performed without data from another sub-query or other action. Each of the atomic tasks can be performed to obtain a subset of data, and the obtained data can be combined according to the operators in order to generate the query result. By decomposing the query into atomic task, the query can be parallelized as each of the atomic tasks can be performed without reliance on any of the other atomic tasks.

Figure 14:
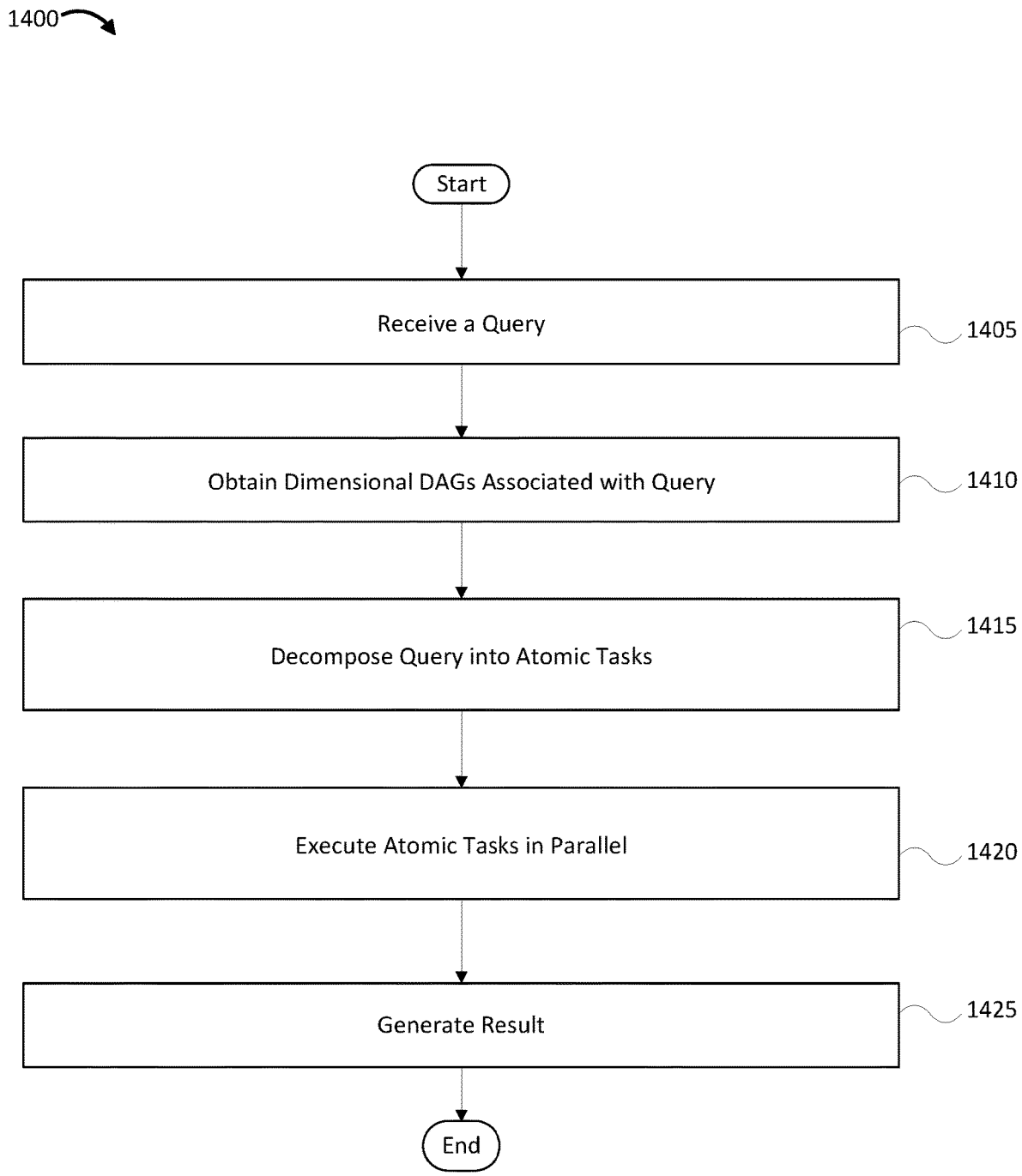
FIG. 14 shows a flow diagram of an example method for determining aggregations in parallel in accordance with one or more aspects described herein.

FIG. 14 shows a flow diagram of an example method for determining aggregations in parallel in accordance with one or more aspects described herein. The abstract syntax tree can be parsed via asynchronous, dynamically parallel processes. Some or all of the steps of the process 1400 can be performed by one or more computing devices described herein. The steps of the process 1400 can be modified, omitted, and/or performed in other orders, and/or other steps added in accordance with aspects of the disclosure.

At step 1405, a computing device can obtain a query. The query can indicate one or more dimensions of data and/or a requested operation (e.g. aggregation) to be performed on the indicated data. At step 1410, one or more dimensional DAGs can be obtained. The dimensional DAGs can correspond to the one or more dimensions indicated in the query. In several embodiments, the dimensional DAGs can be obtained from a data store server system.

At step 1415, the query can be decomposed into one or more atomic tasks. In several embodiments, the query can be decomposed by generating an abstract syntax tree for the query and parsing the abstract syntax tree. In several embodiments, the abstract syntax tree includes one or more nodes indicating a task that can be performed. A node can be related to one or more child nodes by an operation. An atomic task can be associated with a node that has no child nodes.

At step 1420, the atomic tasks can be executed. In several embodiments, an atomic task is executed by transmitting the atomic task to a server system that generates a result based on the task and one or more DAGs associated with dimensions indicated in the task. In many embodiments, the generated result in a collection of nodes as described herein. In a variety of embodiments, some or all of the tasks are executed in parallel. The tasks can be executed in parallel using a single server system and/or multiple server systems as appropriate. In several embodiments, a single server system can assign each atomic task to one or more execution threads and perform the execution threads in parallel, such as on different processing cores. In a number of embodiments, each atomic task can be provided to a different server system and each server system can independently execute the atomic task provided. However, it should be noted that tasks can be performed by any number or combination of server systems, in parallel or serially, as appropriate.

At step 1425, a result can be generated. The generated result can be responsive to the received query. In many embodiments, the result is generated by aggregating each of the results for each of the atomic tasks according to the operations linking the atomic tasks. For example, the result for a task indicated in a node can be calculated by performing the sub-tasks indicated in the child node(s) and combining the result of each child node according to the operation(s) linking the child node to its parent. In a variety of embodiments, the result is a collection of sink nodes generated based on the union of sink nodes identified by the execution of each of the atomic tasks.

Figure 15:
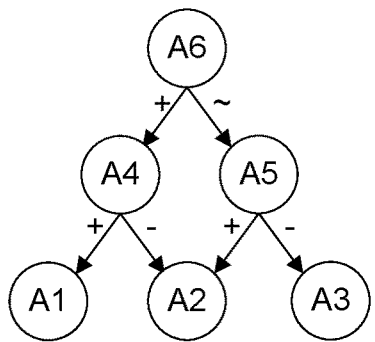
FIG. 15 shows an example of using a graph traversal algorithm to reduce aggregations across multidimensional hierarchies in accordance with one or more aspects described herein.
Figure 15:
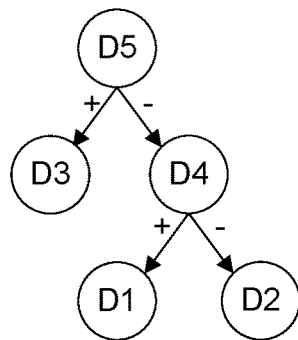
Figure 15:
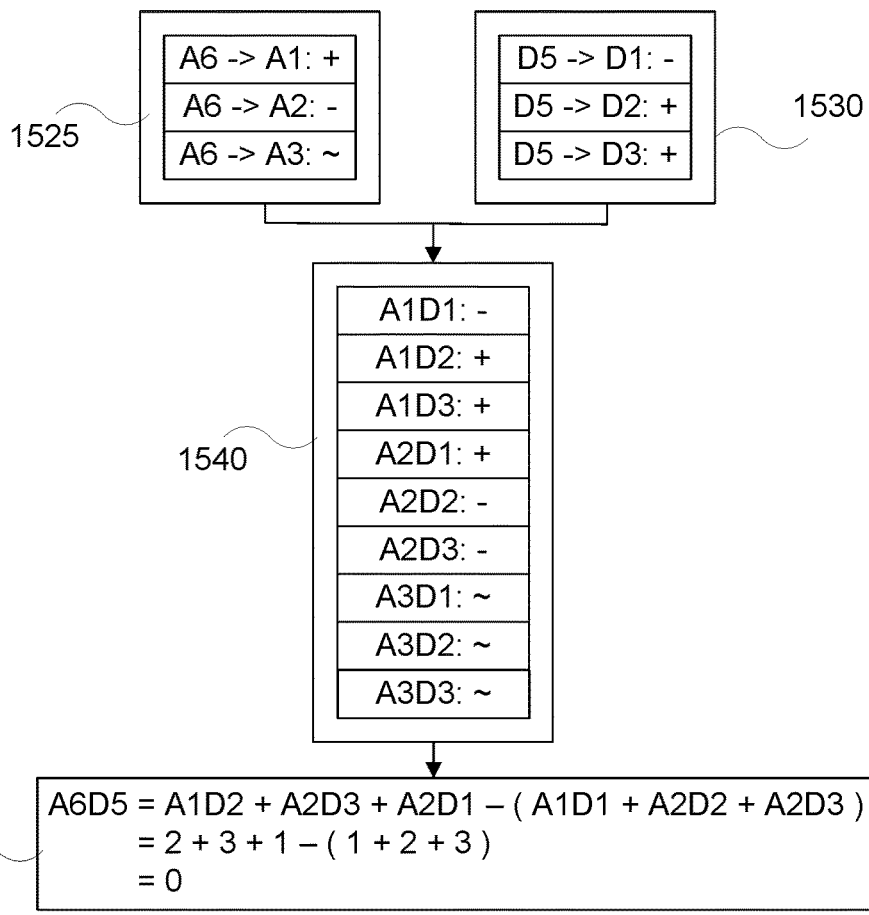

FIG. 15 shows an example of using a graph traversal algorithm to reduce aggregations across multidimensional hierarchies in accordance with one or more aspects described herein. An Account DAG 1505 includes nodes A1-A6. A Department DAG 1510 includes the nodes D1-D5. The edge, node, and sink node hyperedge information associated with the Account DAG 1505 and the Department DAG 1510 can be stored using a DAG data store. The edges of the DAGs 1505 and 1510 can be associated with arithmetic operations, such as addition (+), subtraction (−), and ignore (~). Database table 1520 includes information describing hyperedges of the DAGs 1505 and 1510 along with the associated measure values. For example, the database table 1520 indicates a hyperedge including sink nodes A1 and D1 with a measure value of "1," a hyperedge including sink nodes A1 and D2 with a measure value of "2," a hyperedge including sink nodes A1 and D3 with a measure value of "3," a hyperedge including sink nodes A2 and D1 with a value of "1," a hyperedge including sink nodes A2 and D2 with a measure value of "2," a hyperedge including sink nodes A2 and D3 with a measure value of "3," a hyperedge including sink nodes A3 and D1 with a measure value of "1," a hyperedge including sink nodes A3 and D2 with a measure value of "2," and a hyperedge including sink nodes A3 and D3 with a measure value of "3."

A query can be parsed, for example, using the query decomposition methods discussed herein, and the dimensions relevant for the query can be identified. For example, the dimensions "Account" and "Department" can be identified as being relevant for the query. Thus, the input data for the query can include information associated with the corresponding DAGs 1505 and 1510. In some aspects of the disclosure, the input data can be partitioned and a graph traversal can be used to select only needed partitions of the input data relevant to perform particular aggregations associated with the query. For example, the input data can include the information associated with the DAGs 1505 and 1510.

To aggregate the measure values for any combination of parent node values from the DAGs 1505 and 1510, the graph traversal processes described herein can be utilized to determine the sink nodes involved in the aggregation. For example, a graph traversal algorithm can be used to traverse the DAGs 1505 and 1510 from an aggregation node, such as the source node A6 or the source node D5, to all of its lowest level nodes (e.g. sink nodes D1, D2, D3 and A1, A2, A3).

The classifications 1525 of the sink nodes A1, A2, and A3 can be based on the traversal operations from the source node A6 of the Account DAG 1505 to each of its sink nodes. The sink nodes A1 and A2 are classified respectively as "+" and "−." The sink node A3 does not contribute to the aggregation of the source node A6, and is therefore classified as "~." Classifications 1530 of the sink nodes D1, D2, and D3 can be based on the traversal operations from the source node D5 of the Department DAG 1510 to each of its sink nodes. The traversal from the source node D5 to the sink node D2 includes the edges D5→D4 and D4→D2. The consolidation operator for the edge D5→D4 is "−" with an associated encoding of "−1" and the consolidation operator for the edge D4→D2 is "−" with an associated encoding of "−1". The classification for the sink node D2 can be determined based on the edge values (e.g. consolidation operators and associated encodings) and a traversal operation. In several embodiments, the traversal operation includes a product operation, although any traversal operation(s) can be used as appropriate. Thus, the classification of the sink node D2 can be determined by applying the traversal operation on the encodings of the consolidation operators as: (−1*−1)=1. The classification of the sink node D2 can be determined by applying the traversal operation to the consolidation operators as: (−*−)="+."

Referring to FIG. 15, a hyperedge between the Account DAG 1505 and the

Department DAG 1510 can be determined based on a combination of the classifications 1525 of the Account DAG 1505 sink nodes (e.g. A6→A1, A6→A2, and A6→A3), the classifications 1530 of the Department DAG 1510 sink nodes (e.g. D5→D1, D5→D2, and D5→D3), and the hyperedge values 1520 (i.e. values of the edges between the sink nodes of the dimensional DAGs 1505 and 1510). Table 1540 shows the calculation of Cartesian product of classified sink nodes from 1525 and 1530. Table 1550 shows the calculation of aggregation value for hyperedge connecting source node A6 and D5. As shown in table 1550, the result of aggregated measure value is zero.

Figure 16:
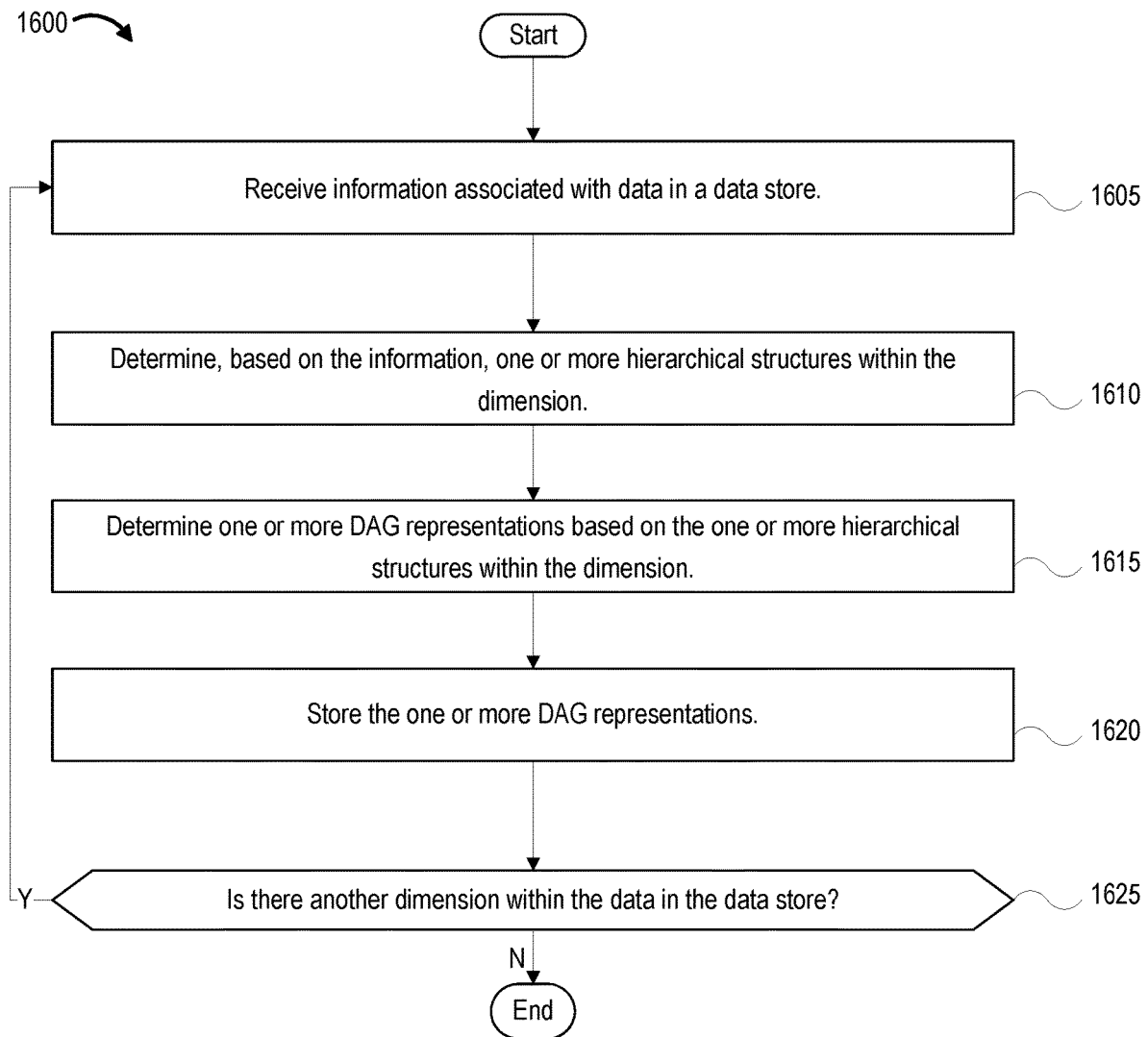
FIG. 16 shows a flow diagram of an example method for generating dimensional DAGs for dimensions of a data store in accordance with one or more aspects described herein.

FIG. 16 is a flow diagram of an example method for determining DAG representations for a data store in accordance with one or more aspects described herein. Some or all of the steps of the method 1600 can be performed by one or more computing devices as described herein. The steps of the method 1600 can be modified, omitted, and/or performed in other orders, and/or other steps added as needed.

At step 1605, a computing device can receive information associated with data. The data can be stored using any of a variety of data stores storing a variety of dimensional data as described herein.

At step 1610, a computing device can determine, based on the received information, one or more hierarchical structures within the dimension. Each dimension can have a hierarchy associated with it, As an example, data related to a location dimension can be captured as a zip or postal code, which can successively roll into data related to a county, state, nation, and continent. Similarly, other dimensions can have other hierarchies associated with them. A dimension can have multiple hierarchies within the dimension.

At step 1615, a computing device can determine one or more DAG representations based on the one or more hierarchical structures within the dimension. As discussed herein, the DAG representations can express the hierarchical structure within each dimension of a database. Each DAG representation can include a plurality of nodes and edges. The nodes can include one source node, one or more non-sink nodes, and/or one or more sink nodes. Each node can be unique to its corresponding DAG. At step 1620, a computing device can store the one or more DAG representations in a DAG data. The stored DAG representations can be used to generate results to a query for the corresponding database as described herein.

At step 1625, a computing device can determine if there is another dimension in the data for which a DAG representation does not exist in the DAG data store. If it is determined that there is another dimension of the data for which a DAG representation does not exist, then the process 1600 returns to step 1605.

A computing device can submit a query associated with data stored in a data store. The query can be transmitted from the computing device to a server system. The server system can obtain the query and generate a response to the query. In a variety of embodiments, the server system decomposes the obtained query into a set of atomic functions that indicate one or more dimensions of the database. The atomic functions can be executed in parallel on DAG representations of the identified dimensions to obtain intermediate results for each of the atomic functions. A variety of operations can be performed on the intermediate results (as indicated in the decomposition of the query) to aggregate the intermediate results into a query result. The query result can be provided to the computing device (and/or stored in a data store) for further processing and analysis as appropriate. In this way, the query can be performed in parallel on multiple DAGs, thereby improving resource allocation and the speed at which the query response can be generated. In a variety of embodiments, the atomic functions can be distributed to a plurality of server systems for execution.

Figure 17:
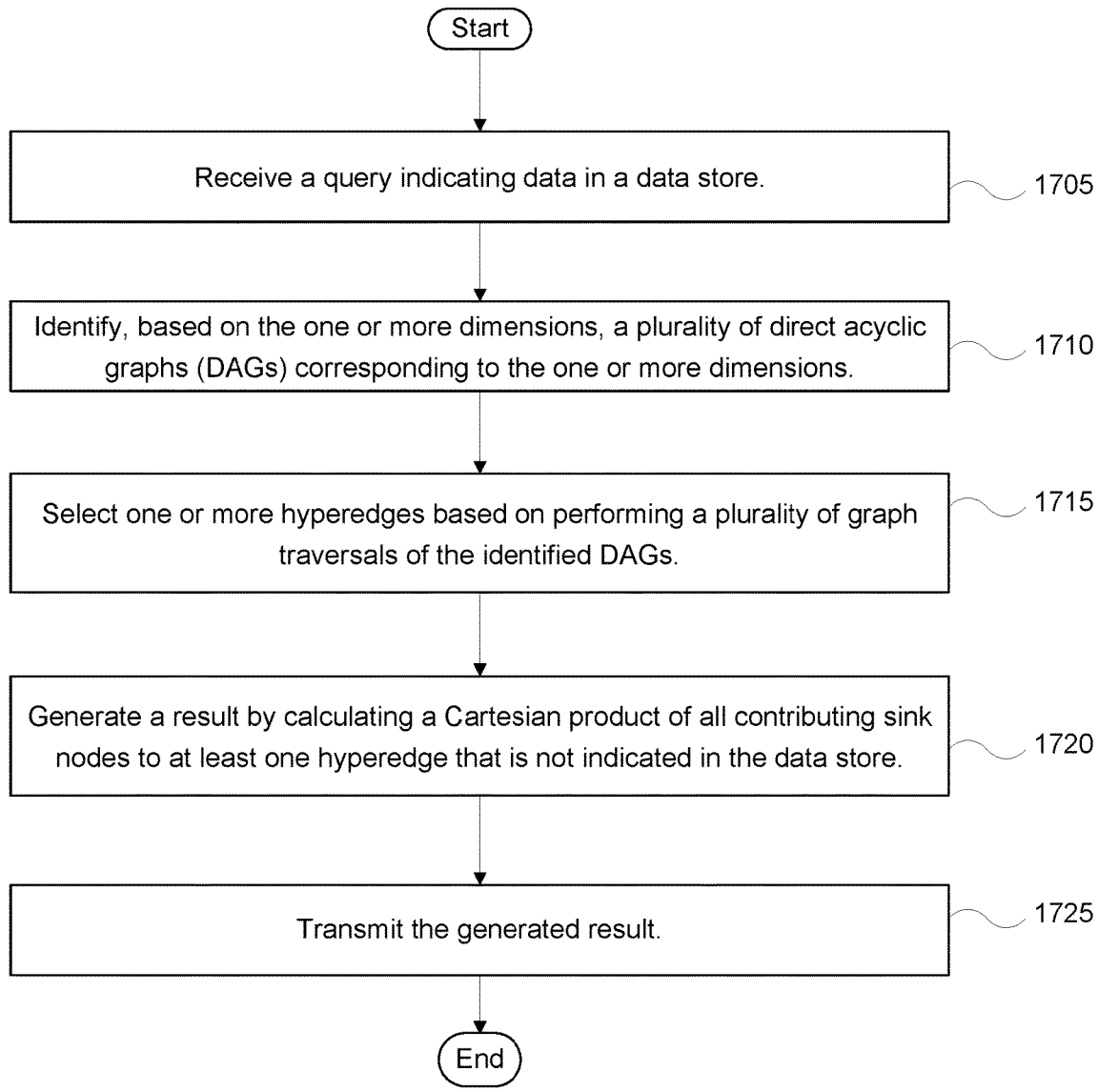
FIG. 17 shows a flow diagram of an example method for query processing of multidimensional hierarchical data in accordance with one or more aspects described herein.

FIG. 17 is a flow diagram of an example method for providing multidimensional hierarchical data analysis in accordance with one or more aspects described herein. Some or all of the steps of the method 1700 can be performed by one or more computing devices as described herein. The steps of the method 1700 can be modified, omitted, and/or performed in other orders, and/or other steps added as needed.

At step 1705, a computing device can obtain a query. The query can identify data stored in one or more data stores. The data can have one or more dimensions. At step 1710, a computing device can identify, based on the one or more dimensions of data, one or more directed acyclic graphs (DAGs) corresponding to the identified one or more dimensions. For example, based on the identified one or more dimensions, information associated with the DAG representations of the identified dimensions can be retrieved from the DAG data store.

At step 1715, a computing device can identify the one or more nodes of the identified DAGs by selecting one or more hyperedges based on performing one or more graph traversals of the identified DAGs. As discussed herein, performing an aggregation can include determining a hyperedge that contains non-sink nodes and therefore, does not exist as a data record. In several embodiments, an aggregation can include one or more nodes from each dimensional DAG. In a variety of embodiments, an aggregation includes exactly one node from each dimensional DAG. Based on these constraints, a mapping of reachable and contributing nodes from this hyperedge can be determined by leveraging the mapping based on bipartite graphs via the graph traversal processes described herein. A valid hyperedge across dimensional DAGs can be determined or discovered based on a combination of the classifications of the sink nodes of each dimensional DAG. Processes for determining the sink nodes associated with the relevant hyperedges are described in more detail with respect to FIG. 13.

At step 1720, a computing device can generate a result to the query. The query result can be generated based on the values of these hyperedges spanning the dimensional DAGs. The result can include the aggregation of the nodes indicated in the hyperedges. In a variety of embodiments, the hyperedges and/or values of the hyperedges can be known and stored as data records. In several embodiments, the values can be reduced via summation. The result of the summation can be returned as the aggregation of the node value. In a number of embodiments, a Cartesian product of all contributing sink nodes to at least one hyperedge that is not indicated in the data store. can be calculated. The result can be generated by combining the Cartesian product with the classified values from the path traversal. In a variety of embodiments, the result of the Cartesian product can be combined with the classified values from the path traversal to generate the aggregation.

At step 1725, a computing device can transmit the generated result. The generated result can be sent to the computing device providing the received query. In a variety of embodiments, the generated result can be stored in a data store. However, in a variety of embodiments, the generated results are not stored in memory in order to reduce memory and/or storage requirements.

One or more aspects discussed herein can be embodied in computer-usable or readable data and/or computer-executable instructions, such as in one or more program modules, executed by one or more computers or other devices as described herein. Generally, program modules include routines, programs, objects, components, data structures, and the like that perform particular tasks or implement particular abstract data types when executed by a processor in a computer or other device. The modules can be written in a source code programming language that is subsequently compiled or interpreted for execution and/or be written in a markup (or otherwise human-readable) language such as (but not limited to) HTML and XML. The computer executable instructions can be stored on a computer readable medium such as a hard disk, optical disk, removable storage media, solid-state memory, RAM, and the like. As will be appreciated by one of skill in the art, the functionality of the program modules can be combined or distributed as desired in various embodiments. In addition, the functionality can be embodied, in whole or in part, in firmware or hardware equivalents such as integrated circuits, field programmable gate arrays (FPGA), and the like. Particular data structures can be used to implement one or more aspects discussed herein, and such data structures are contemplated within the scope of computer executable instructions and computer-usable data described herein. Various aspects discussed herein can be embodied as a method, a computing device, a system, and/or a computer program product.

Although the present invention has been described in certain specific aspects, many additional modifications and variations would be apparent to those skilled in the art. In particular, any of the various processes described herein can be performed in alternative sequences and/or in parallel (on different computing devices) in order to achieve similar results in a manner that is more appropriate to the requirements of a specific application. It is therefore to be understood that the present invention can be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A computer-implemented method of processing queries of multidimensional data comprising:
   receiving, by a first computing device and from a second computing device, a query indicating one or more dimensions of a data store that stores multidimensional data;
   identifying, using one or more processors of the first computing device and based on the one or more dimensions, a plurality of directed acyclic graphs (DAGs) corresponding to the one or more dimensions;
   storing, at a DAG data store associated with the first computing device, representations of the plurality of DAGs, wherein:
      each DAG comprises a representation of a hierarchical structure within the one or more dimensions;
      each DAG comprises a plurality of nodes corresponding to a plurality of members of a corresponding dimension of the one or more dimensions; and
      the plurality of DAGs comprise a plurality of hyperedges, each hyperedge corresponding to a unique combination comprising at least one node from each of the DAGs;
   generating, using the one or more processors of the first computing device, a result responsive to the received query at least by aggregating one or more nodes of the plurality of DAGs; and
   sending, by the first computing device and to-a the second computing device, the generated result responsive to the received query.

2. The computer-implemented method of claim 1, wherein the aggregating comprises:
   selecting one or more hyperedges based on performing a plurality of graph traversals of the plurality of DAGs; and
   determining the result based on numerical values associated with the selected one or more hyperedges.

3. The computer-implemented method of claim 2, further comprising:
   retrieving, by the first computing device, based on the selected one or more hyperedges, data comprising the numerical values of the selected one or more hyperedges.

4. The computer-implemented method of claim 2, wherein generating the result by aggregating the one or more nodes of the plurality of DAGs comprises:
   recursively decomposing the query to generate at least one sub-query and a set of operations;
   executing each of the at least one sub-query to generate a set of intermediate results; and
   aggregating each of the intermediate results based on the set of operations.

5. The computer-implemented method of claim 1, wherein:
   the aggregating comprises identifying at least one hyperedge that is not indicated in the data store; and generating the result comprises calculating a Cartesian product of all contributing sink nodes to at least one hyperedge that is not indicated in the data store.

6. The computer-implemented method of claim 1, wherein:
the query further indicates an aggregation of product sales data over a predetermined time period; and
the computer-implemented method further comprises:
determining, by the first computing device and based on the generated result, current sales data and historical sales data; and
determining, by the first computing device and based on comparing the current sales data and the historical sales data, a change in the product sales data over the predetermined time period.

7. The computer-implemented method of claim 1, wherein the number of nodes identified in each of the hyperedges is the same.

8. The computer-implemented method of claim 1, further comprising:
determining, by the first computing device, at least one additional dimension related to the generated result that is not identified in the query; and
generating, by the first computing device, a second result by aggregating one or more nodes of the plurality of DAGs including the DAG corresponding to the at least one additional dimension.

9. An apparatus for processing queries of multidimensional data, comprising:
one or more processors; and
memory storing instructions that, when executed by the one or more processors, cause the apparatus to:
receive, from a computing device, a query indicating one or more dimensions of a data store that stores multidimensional data;
identify, based on the one or more dimensions, a plurality of directed acyclic graphs (DAGs) corresponding to the one or more dimensions;
store, at a DAG data store associated with the apparatus, representations of the plurality of DAGs, wherein:
each DAG comprises a representation of a hierarchical structure within the one or more dimensions;
each DAG comprises a plurality of nodes corresponding to a plurality of members of a corresponding dimension of the one or more dimensions; and
the plurality of DAGs comprise a plurality of hyperedges, and wherein each hyperedge corresponds to a unique combination comprising at least one node from each of the plurality of DAGs;
generate a result responsive to the received query at least by:
selecting one or more hyperedges based on performing a plurality of graph traversals of the plurality of DAGs stored at the DAG data store; and
determining the result based on numerical values associated with the selected one or more hyperedges; and
send, to the computing device, the generated result responsive to the received query.

10. The apparatus of claim 9, wherein the instructions, when executed by the one or more processors, cause the apparatus to retrieve, based on the selected one or more hyperedges, data comprising the numerical values of the selected one or more hyperedges.

11. The apparatus of claim 9, wherein the instructions, when executed by the one or more processors, cause the apparatus to:
aggregate by identifying at least one hyperedge that is not indicated in the data store; and
generate the result by calculating a Cartesian product of all contributing sink nodes to at least one hyperedge that is not indicated in the data store.

12. The apparatus of claim 9, wherein the query is directed towards obtaining product sales data over a predetermined time period and the instructions, when executed by the one or more processors, cause the apparatus to:
determine, based on the generated result, current sales data and historical sales data; and
determine, based on comparing the current sales data and the historical sales data, a change of the product sales data over the predetermined time period.

13. The apparatus of claim 9, wherein the number of nodes identified in each of the hyperedges is the same.

14. The apparatus of claim 9, wherein the instructions, when executed by the one or more processors, cause the apparatus to generate the result by:
recursively decomposing the query to generate at least one sub-query and a set of operations;
executing each of the at least one sub-query to generate a set of intermediate results; and
aggregating each of the intermediate results based on the set of operations.

15. The apparatus of claim 9, wherein the instructions, when executed by the one or more processors, cause the apparatus to generate, based on determining at least one additional dimension related to the generated result that is not identified in the query, a second result by aggregating one or more nodes of the plurality of DAGs including the DAG corresponding to the at least one additional dimension.

16. A non-transitory machine-readable medium storing instructions that, when executed by one or more processors, cause the one or more processors to perform steps for processing queries of multidimensional data, the steps comprising:
receiving, from a computing device, a query indicating one or more dimensions of a data store that stores multidimensional data;
identifying, based on the one or more dimensions, a plurality of directed acyclic graphs (DAGs) corresponding to the one or more dimensions;
storing, at a DAG data store, representations of the plurality of DAGs, wherein:
each DAG comprises a representation of a hierarchical structure within the one or more dimensions;
each DAG comprises a plurality of nodes corresponding to a plurality of members of a corresponding dimension of the one or more dimensions; and
the plurality of DAGs comprise a plurality of hyperedges, each hyperedge corresponding to a unique combination comprising at least one node from each of the plurality of DAGs;
generating a result responsive to the received query at least by aggregating one or more nodes of the plurality of DAGs, wherein the aggregating comprises:
selecting one or more hyperedges based on performing a plurality of graph traversals of the plurality of DAGs stored at the DAG data store; and
retrieving, from the DAG data store and based on the selected one or more hyperedges, data comprising numerical values of the selected one or more hyperedges; and determining the result based on numerical values associated with the selected one or more hyperedges; and sending, to the computing device, the generated result responsive to the received query.

17. The non-transitory machine-readable medium of claim 16, wherein:

the aggregating comprises identifying at least one hyperedge that is not indicated in the data store; and the generating the result comprises calculating a Cartesian product of all contributing sink nodes to at least one hyperedge that is not indicated in the data store.

18. The non-transitory machine-readable medium of claim 16, wherein:

the query further indicates an aggregation of product sales data over a predetermined time period; and the instructions, when executed by the one or more processors, cause the one or more processors to perform steps comprising:

determining, based on the generated result, current sales data and historical sales data; and determining, based on comparing the current sales data and the historical sales data, a change in the product sales data over the predetermined time period.

19. The non-transitory machine-readable medium of claim 16, wherein the generating the result by aggregating the one or more nodes of the plurality of DAGs comprises:

identifying a formula indicated in the query;

decomposing the formula into a plurality of sub-formulas that are linked together by a single common reduced operation; and aggregating the one or more nodes by recursively applying the plurality of sub-formulas to the one or more nodes.

20. The non-transitory machine-readable medium of claim 16, wherein the instructions, when executed by the one or more processors, cause the one or more processors to perform steps comprising generating, based on determining at least one additional dimension related to the generated result that is not identified in the query, a second result by aggregating one or more nodes of the plurality of DAGs including the DAG corresponding to the at least one additional dimension.

* * * * *